US011277566B2

United States Patent
Le et al.

(10) Patent No.: US 11,277,566 B2
(45) Date of Patent: Mar. 15, 2022

(54) OPTICAL DEVICES FOR INDEPENDENT MOVEMENT CONTROL OF LENSES AND IMAGE SENSORS IN CAMERA SYSTEMS

(71) Applicant: Western Digital Technologies, Inc., San Jose, CA (US)

(72) Inventors: Quang Le, San Jose, CA (US); Zhigang Bai, Fremont, CA (US); Xiaoyong Liu, San Jose, CA (US); Zhanjie Li, Pleasanton, CA (US); Kuok San Ho, Emerald Hills, CA (US); Rajeev Nagabhirava, Santa Clara, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 10 days.

(21) Appl. No.: 16/915,730

(22) Filed: Jun. 29, 2020

(65) Prior Publication Data

US 2021/0409601 A1 Dec. 30, 2021

(51) Int. Cl.
*H04N 5/232* (2006.01)
*H04N 5/225* (2006.01)
(Continued)

(52) U.S. Cl.
CPC .......... *H04N 5/23287* (2013.01); *G03B 3/10* (2013.01); *G03B 13/36* (2013.01); *H04N 5/2254* (2013.01);
(Continued)

(58) Field of Classification Search
USPC ....................................... 396/55; 348/208.99
See application file for complete search history.

(56) References Cited

U.S. PATENT DOCUMENTS 7,679,647 B2 * 3/2010 Stavely .............. H04N 5/23287
348/208.99
8,041,201 B2 * 10/2011 Eromaki .............. G02B 27/646
396/55
(Continued)

FOREIGN PATENT DOCUMENTS

EP 2960716 A2 12/2015
JP 2019174780 A 10/2019
(Continued)

OTHER PUBLICATIONS

Simon, Eric et al., "Optical design rules of a camera module with a liquid lens and principle of command for AF and OIS functions", Proceedings of SPIE—The International Society for Optical Engineering, Nov. 2010.
(Continued)

*Primary Examiner* — Clayton E. LaBalle
*Assistant Examiner* — Warren K Fenwick
(74) *Attorney, Agent, or Firm* — Patterson & Sheridan, LLP; Steven H. Versteeg

(57) ABSTRACT

Aspects of the present disclosure relate to optical devices and related methods that facilitate independent control of movement of lenses and image sensors in camera systems. In one example, an image sensor is movable independently of and relative to a lens, and the lens is movable independently of the image sensor. In one example, an optical device includes a lens, and an image sensor disposed below the lens. The image sensor is movable relative to the lens. The optical device includes a plurality of magnets disposed about the lens, a plurality of vertical coil structures coiled in one or more vertical planes, and one or more horizontal coil structures coiled in one or more horizontal planes. The plurality of vertical coil structures are configured to, when powered, move the image sensor relative to the lens. The one
(Continued)

or more horizontal coil structures are configured to, when powered, move the lens.

24 Claims, 16 Drawing Sheets

(51) Int. Cl.
    *G03B 3/10* (2021.01)
    *G03B 13/36* (2021.01)
(52) U.S. Cl.
    CPC ... *H04N 5/2257* (2013.01); *G03B 2205/0069* (2013.01)

(56) References Cited

U.S. PATENT DOCUMENTS

| | | | |
|---|---|---|---|
| 8,264,549 B2* | 9/2012 | Tokiwa | G02B 27/646 |
| | | | 348/208.11 |
| 8,780,217 B2* | 7/2014 | Irisawa | G03B 5/00 |
| | | | 348/208.7 |
| 9,134,503 B2 | 9/2015 | Topliss | |
| 9,329,356 B2 | 5/2016 | Chao et al. | |
| 9,360,735 B2 | 6/2016 | Lim et al. | |
| 9,516,212 B2 | 12/2016 | Kang et al. | |
| 9,599,836 B2 | 3/2017 | Lam | |
| 9,746,689 B2 | 8/2017 | Ollila | |
| 9,955,086 B2 | 4/2018 | Park | |
| 9,983,380 B2 | 5/2018 | Kang et al. | |
| 10,269,895 B2 | 4/2019 | Babcock et al. | |
| 10,303,041 B2 | 5/2019 | Sharma | |
| 10,429,608 B1 | 10/2019 | Baer et al. | |
| 10,516,826 B2 | 12/2019 | Miller et al. | |
| 10,520,697 B2 | 12/2019 | Hu et al. | |
| 10,890,734 B1 | 1/2021 | Sharma et al. | |
| 11,172,131 B1* | 11/2021 | Le | H04N 5/23287 |
| 2004/0190402 A1 | 9/2004 | Matsui | |
| 2005/0265705 A1 | 12/2005 | Uenaka | |
| 2009/0251551 A1 | 10/2009 | Uenaka | |
| 2011/0286099 A1 | 11/2011 | Shiraki et al. | |
| 2012/0099201 A1 | 4/2012 | Chan et al. | |
| 2013/0321917 A1 | 12/2013 | Nakayama | |
| 2015/0207968 A1 | 7/2015 | Yeo | |
| 2015/0207983 A1 | 7/2015 | Kang et al. | |
| 2015/0256727 A1 | 9/2015 | Kim et al. | |
| 2016/0085086 A1* | 3/2016 | Rho | H04N 5/23248 |
| | | | 348/208.99 |
| 2016/0119517 A1 | 4/2016 | Topliss | |
| 2016/0231529 A1 | 8/2016 | Mitsuyasu | |
| 2017/0176710 A1 | 6/2017 | Peng et al. | |
| 2017/0177301 A1 | 6/2017 | Hollis | |
| 2018/0091709 A1 | 3/2018 | Yeo | |
| 2018/0157004 A1 | 6/2018 | Huang et al. | |
| 2018/0246341 A1 | 8/2018 | Jung et al. | |
| 2018/0329170 A1 | 11/2018 | Huang et al. | |
| 2018/0356473 A1 | 12/2018 | Hirota et al. | |
| 2019/0020822 A1 | 1/2019 | Sharma et al. | |
| 2019/0058832 A1 | 2/2019 | Huang et al. | |
| 2019/0116317 A1 | 4/2019 | Hu et al. | |
| 2019/0141248 A1 | 5/2019 | Hubert et al. | |
| 2019/0196156 A1 | 6/2019 | Goldenberg et al. | |
| 2019/0204531 A1 | 7/2019 | Sugawara | |
| 2019/0235202 A1 | 8/2019 | Smyth et al. | |
| 2019/0373174 A1 | 12/2019 | Ba-Tis et al. | |
| 2020/0026095 A1 | 1/2020 | Miller et al. | |
| 2020/0064587 A1 | 2/2020 | Yu et al. | |
| 2020/0124839 A1 | 4/2020 | Aschwadnden et al. | |
| 2020/0209439 A1* | 7/2020 | Hu | G02B 3/14 |
| 2020/0260011 A1 | 8/2020 | Sasaki et al. | |
| 2020/0314338 A1* | 10/2020 | Johnson | G03B 5/00 |
| 2020/0314345 A1 | 10/2020 | Moriya et al. | |

FOREIGN PATENT DOCUMENTS

| | | |
|---|---|---|
| KR | 20180024145 A | 3/2018 |
| WO | 2016207754 A1 | 12/2016 |
| WO | 2019084728 A1 | 5/2019 |
| WO | 2019198524 A1 | 10/2019 |

OTHER PUBLICATIONS

Chang, Yu-Hao et al., "Design of Miniaturized Optical Image Stabilization and Autofocusing Camera Module for Cellphones", Sensors and Materials, vol. 29, No. 7, Jul. 26, 2017, pp. 989-995.
Simon, Eric et al., "Liquid lens enabling real-time focus and tilt compensation for optical image stabilization in camera modules", Proceedings of SPIE—The International Society for Optical Engineering, Apr. 2010, pp. 1-7.
"Folded Camera Actuation & OIS Telephoto Camera OIS and Auto Focus," https://corephotonics.com/inventions/folded-camera-actuation-and-ois.
International Search Report and the Written Opinion for International Application No. PCT/US2020/066657 dated Mar. 24, 2021, 15 pages.
International Search Report and the Written Opinion for International Application No. PCT/US2020/066660 dated Mar. 22, 2021, 16 pages.
Non-Final Office Action dated May 27, 2021 of U.S. Appl. No. 16/915,742.
Non-Final Office Action dated Apr. 27, 2021 of U.S. Appl. No. 16/915,739.
Non-Final Office Action dated Jun. 24, 2021 of U.S. Appl. No. 16/915,723.

* cited by examiner

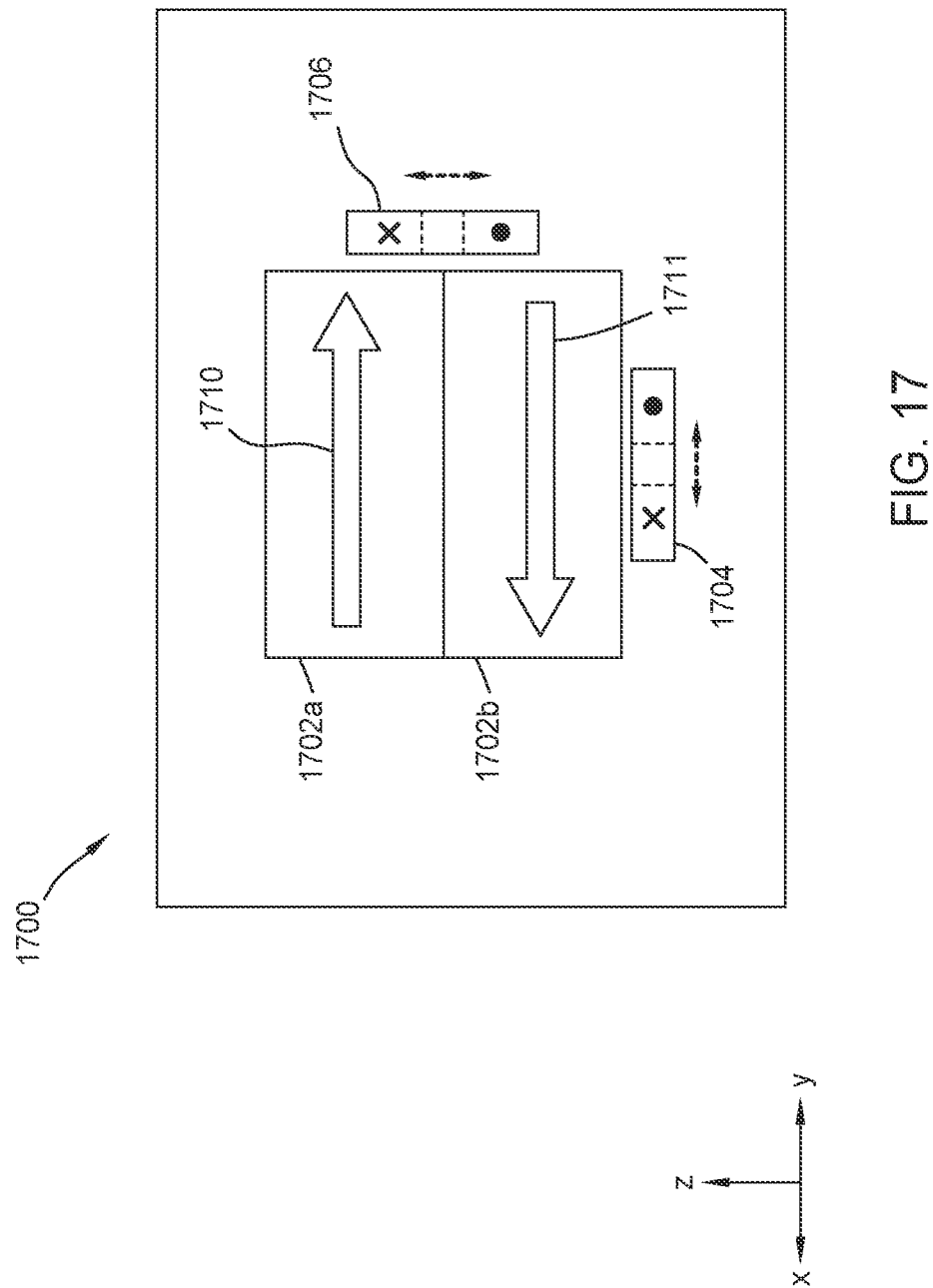

OPTICAL DEVICES FOR INDEPENDENT MOVEMENT CONTROL OF LENSES AND IMAGE SENSORS IN CAMERA SYSTEMS

BACKGROUND OF THE DISCLOSURE

Field of the Disclosure

Aspects of the present disclosure generally relate to optical devices and related methods that facilitate independent control of movement of lenses and image sensors in camera systems. In one example, an image sensor is movable independently of and relative to a lens, and the lens is movable independently of the image sensor.

Description of the Related Art

Cameras are used to take images and/or videos of targets, such as persons or objects, in a variety of contexts and environments. Images and videos taken by the cameras, however, can become unstable or out of focus, such as when the camera is moved or shaken, or when manufacturing results in camera components that are out of alignment. Cameras can sometimes not sufficiently account for the instability or becoming out of focus, causing image defects and hindering image quality of the camera. Cameras can sometimes not establish optimal optical paths for lenses and optimal images for image sensors.

Image sensors of cameras may also not be movable. Components of cameras also may not be able to tilt.

Therefore, there is a need in the art for optical devices and related methods that facilitate independently movable image sensors relative to lenses, and that facilitate tilt, optimal image stabilization (OIS), and auotofocus (AF) of camera systems.

SUMMARY OF THE DISCLOSURE

Aspects of the present disclosure generally relate to optical devices and related methods that facilitate independent control of movement of lenses and image sensors in camera systems. In one example, an image sensor is movable independently of and relative to a lens, and the lens is movable independently of the image sensor. In one example, an optical device includes a lens, and an image sensor disposed below the lens. The image sensor is movable relative to the lens. The optical device includes a plurality of magnets disposed about the lens, a plurality of vertical coil structures coiled in one or more vertical planes, and one or more horizontal coil structures coiled in one or more horizontal planes. When power is applied, the coil structures can generate magnetic fields that, in the presence of the magnets, cause relative movement of the coil structures and associated structures. The generated magnetic fields attract or repel the magnets, facilitating relative movement of the coil structures. The plurality of vertical coil structures are configured to, when powered, move the image sensor relative to the lens. The one or more horizontal coil structures are configured to, when powered, move the lens. In addition, various embodiments are directed to arrangements of such coil structures and magnets, and magnet compositions and designs, to improve efficiency of the overall system.

In one implementation, an optical device includes a lens and an image sensor disposed below the lens. The image sensor is movable relative to the lens. The optical device includes a plurality of magnets disposed about the lens and magnetized horizontally toward the lens to generate magnetic fields horizontally in horizontal directions toward the lens. The optical device includes a plurality of vertical coil structures coiled in one or more vertical planes, and one or more horizontal coil structures coiled in one or more horizontal planes.

In one implementation, an optical device includes a lens, and an image sensor disposed below the lens. The image sensor is movable relative to the lens. The optical device includes a first plurality of magnets disposed about the lens and at corners of a square pattern, and a second plurality of magnets disposed about the lens and at sides of the square pattern. The optical device includes a plurality of vertical coil structures coiled in one or more vertical planes that, when powered, horizontally move the image sensor or the lens. Each vertical coil structure of the plurality of vertical coil structures is disposed inwardly of an inner surface of a respective magnet of the second plurality of magnets. The optical device includes a plurality of horizontal coil structures coiled in one or more horizontal planes that, when powered, move the lens or the image sensor. Each horizontal coil structure of the plurality of horizontal coil structures includes a center aligned above or below a respective magnet of the first plurality of magnets.

In one implementation, an optical device includes a lens and an image sensor disposed below the lens. The image sensor is movable relative to the lens. The optical device includes a first plurality of magnets disposed about the lens and magnetized horizontally toward the lens to generate magnetic fields horizontally in horizontal directions toward the lens, and a second plurality of magnets disposed about the lens and magnetized horizontally away from the lens to generate magnetic fields horizontally in horizontal directions away from the lens. Each magnet of the second plurality of magnets is disposed above or below a respective magnet of the first plurality of magnets. The optical device also includes one or more horizontal coil structures coiled in one or more horizontal planes that, when powered, horizontally move the lens or the image sensor.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 15-17 are schematic illustrations of side views of multiple coil arrangements of an optical device of a camera system, according to disclosed embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
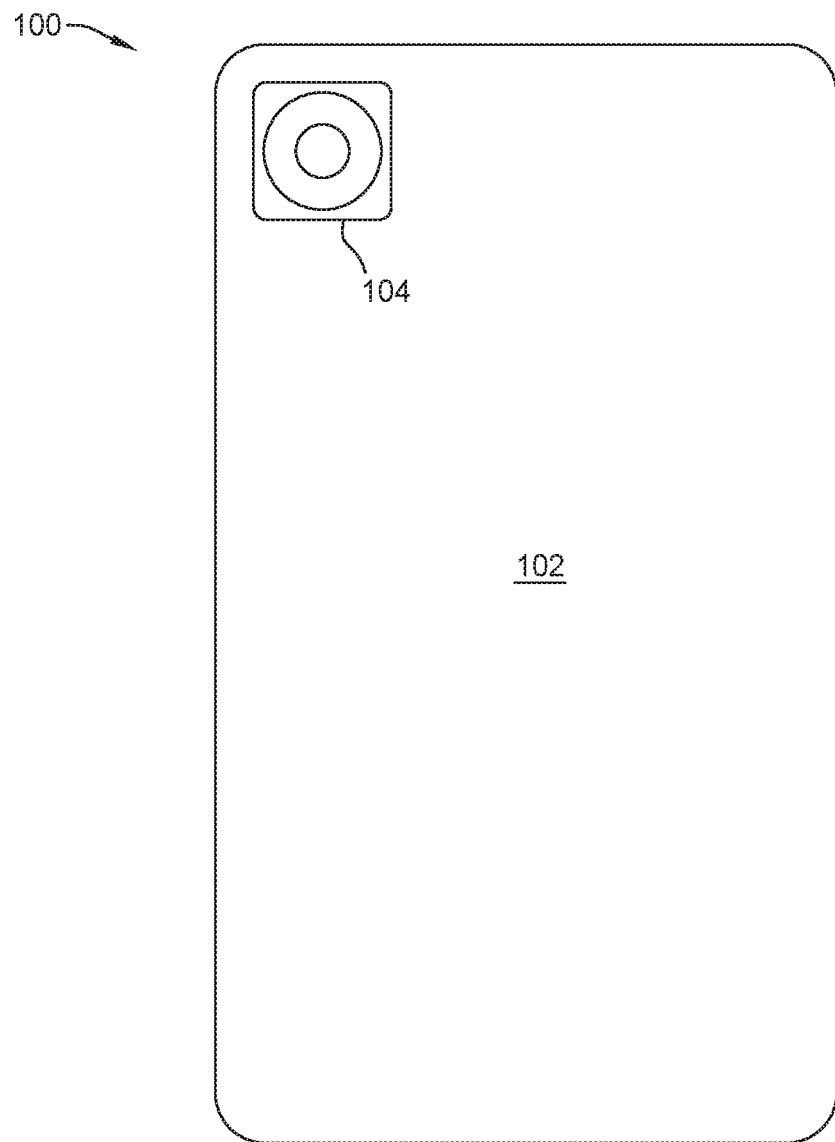
FIG. 1 is a schematic illustration of a device housing a camera, according to disclosed embodiments.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure generally relate to optical devices and related methods that facilitate independent control of movement of lenses and image sensors in camera systems. In one example, an image sensor is movable independently of and relative to a lens, and the lens is movable independently of the image sensor. In one example, an optical device includes a lens, and an image sensor disposed below the lens. The image sensor is movable relative to the lens. The optical device also includes a plurality of magnets disposed about the lens, a plurality of vertical coil structures coiled in one or more vertical planes, and one or more horizontal coil structures coiled in one or more horizontal planes. When power is applied, the coil structures can generate magnetic fields that, in the presence of the magnets, cause relative movement of the coil structures and associated structures. The generated magnetic fields attract or repel the magnets, facilitating relative movement of the coil structures. The plurality of vertical coil structures are configured to, when powered, move the image sensor relative to the lens. The one or more horizontal coil structures are configured to, when powered, move the lens. In addition, various embodiments are directed to arrangements of such coil structures and magnets, and magnet compositions and designs, to improve efficiency of the overall system.

The plurality of horizontal coil structures moving the lens vertically and tilting the lens facilitate autofocus (AF) functions for the camera system, facilitate adjusting for misalignment (e.g., non-parallelism) between the lens and the image sensor, facilitate obtaining a wider angle of view for the lens, and facilitate an optimal optical path for the lens. The plurality of vertical coil structures horizontally moving the image sensor facilitate optical image stabilization (OIS) functions for the camera system and an optimal image for the image sensor.

It is to be understood that relational terms used herein such as "horizontal," "vertical," "above," "below," "lower", and "upper" are understood to be in relation to the pertinent camera system. As an example, the camera system may be positioned such that horizontal planes are parallel to gravitational forces and vertical planes are perpendicular to gravitational forces.

The optical devices and camera systems described herein are described as part of a smartphone device. It is to be understood that aspects described herein may be used as part of other personal devices, such as other mobile devices (for example tablets) or personal computers (for example laptops or desktops), or other systems, such as surveillance camera systems, aviation camera systems, or vehicular camera systems. The present disclosure contemplates that the aspects describe herein may be used in any camera system.

FIG. 1 is a schematic illustration of a device 100 housing a camera 104, according to disclosed embodiments. The device 100 includes a housing 102 and a camera 104. The device 100 may include any of a wide range of devices, including desktop computers, notebook (e.g., laptop) computers, tablet computers, set-top boxes, telephone handsets such as so-called "smart" phones, so-called "smart" pads, televisions, security cameras, display devices, digital media players, video gaming consoles, video streaming device, and the like.

The housing 102 may be formed using any materials by joining a first end of a first wall to a first end of a second wall, a second end of a second wall to a first end of a third wall, a second end of a third wall to a first end of a fourth wall, and a second end of a fourth wall to a second end of the first wall. Furthermore, the housing 102 may be formed by including a fifth wall and a sixth wall. The sixth wall is joined to a first edge of the first wall, a first edge of the second wall, a first edge of the third wall, and a first edge of the fourth wall. The fifth wall is joined to a second edge of the first wall, a second edge of the second wall, a second edge of the third wall, and a second edge of the fourth wall. The first edge and second edge are on opposite sides of each wall. The plurality of walls, the sixth wall, and the fifth wall may be joined together by any suitable structures such as adhesives, fasteners (for example, screws), joints, or any combination thereof. It is contemplated that other methods not listed of joining together materials may be applicable.

The housing 102 may house components such as a controller, a non-volatile memory, a power supply, a volatile memory, an interface, a buffer, a printed circuit board, and the like. Furthermore, the housing 102 may have a slot for additional memory storage devices, such as single-level cell memory, multi-level cell memory, triple-level cell memory, quad-level cell memory, and the like. The housing 102 may also have a connection unit to a power source or to transfer data to and from the device 100. Each component of the device 100 may be mechanically attached to the housing 102 or to another component and may include electrically conductive traces that electrically interconnect components of the device 100. In one example, the device 100 may be connected directly to a computer server, network attached storage unit, or the like.

The camera 104 may include any function relating to an optical instrument used to record images and/or video. The camera 104 captures light photons, where the light photons may be in the visible spectrum and/or in other portions of the electromagnetic spectrum (e.g., the infrared spectrum). The camera 104 includes a small opening (e.g., an aperture) to let the light in to capture an image on a light-sensitive surface or substrate (e.g., a photographic film or a digital sensor). The opening may be any shape suitable to let light into the camera 104 such as a circular opening. The substrate may include a transition metal-halide. In one example, the camera 104 is configured to adjust the size of the small hole to allow more or less light into the camera 104. The camera 104 may also have a shutter mechanism to determine the amount of time the light-sensitive surface is exposed to the light. In other embodiments, the images captured by the camera may be stored on a memory storage device as a series of images over time, (e.g., a video).

Figure 2A:
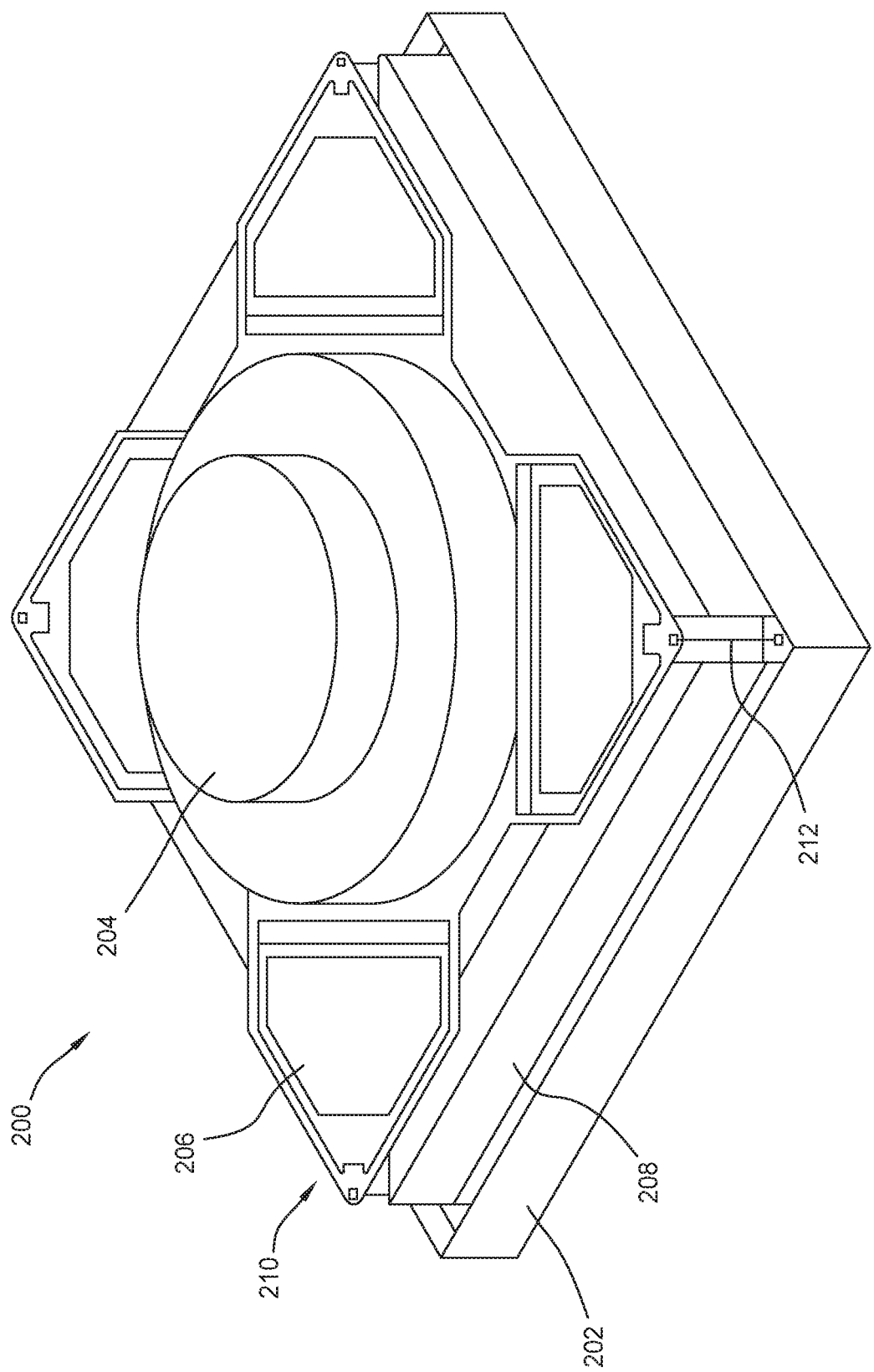
FIG. 2A is a schematic illustration of a top isometric view of a camera system, according to disclosed embodiments.

FIG. 2A is a schematic illustration of a top isometric view of a camera system 200, according to disclosed embodiments. The camera system 200 may be used as the camera 104 described in FIG. 1. The camera system 200 includes a frame 202, a lens 204, a magnet housing 208 for a plurality of magnets 206 (four are shown), where each magnet 206 may be coupled to one or more coils, such as an optical image stabilization (OIS) coil and/or an autofocus (AF) coil. Each magnet 206 may be coupled to a top panel 210, and a plurality of wires 212.

Figure 2B:
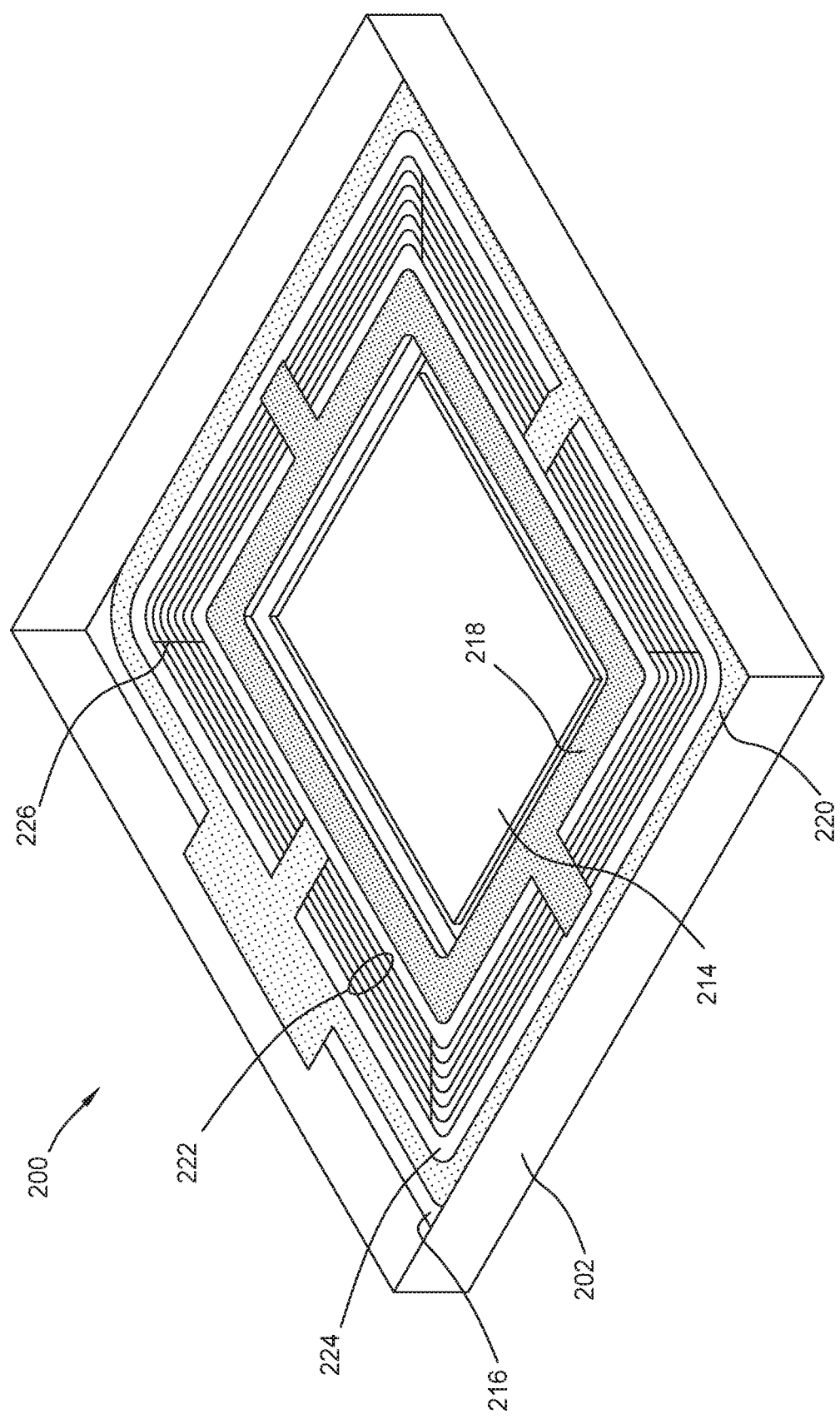
FIG. 2B is a schematic illustration of a bottom isometric view of the camera system shown in FIG. 2A, according to disclosed embodiments.

FIG. 2B is a schematic illustration of a bottom isometric view of the camera system 200 shown in FIG. 2A, according to disclosed embodiments. The camera system 200 further includes an image sensor 214, a bottom panel 216, an adjustable platform 218, a static platform 220, a plurality of panel arms 222, a base 224, and a plurality of panel stabilizers 226.

The frame 202 of the camera system 200 may be formed by the materials described for the housing 102 of FIG. 1. The frame 202 may be part of, integrally formed with, and/or coupled to the housing of FIG. 1. The lens 204 may include one more optical lens elements, where light passing through the lens 204 is captured at the image sensor 214. The light passing through the lens 204 converges to a point on the image sensor 214. The image sensor 214 may be situated on the static platform 220 of the bottom panel 216 of the base 224. The base 224 may include other components such as circuitry for the function of the various components of the camera system 200.

The adjustable platform 218 includes a plurality of panel arms 222 and a plurality of panel stabilizers 226. The plurality of panel arms 222 may shift or adjust the plurality of magnets 206 as a response to a change in the current passing through the OIS coils and/or the AF coils. The plurality of panel stabilizers 226 may include any suitable material for vibration dampening. The plurality of wires 212 may connect the top panel 210 to the bottom panel 216. The top panel 210 and the bottom panel may be constructed from any appropriate material that may allow for some amount of flex during the operation of the camera system 200.

Figure 3:
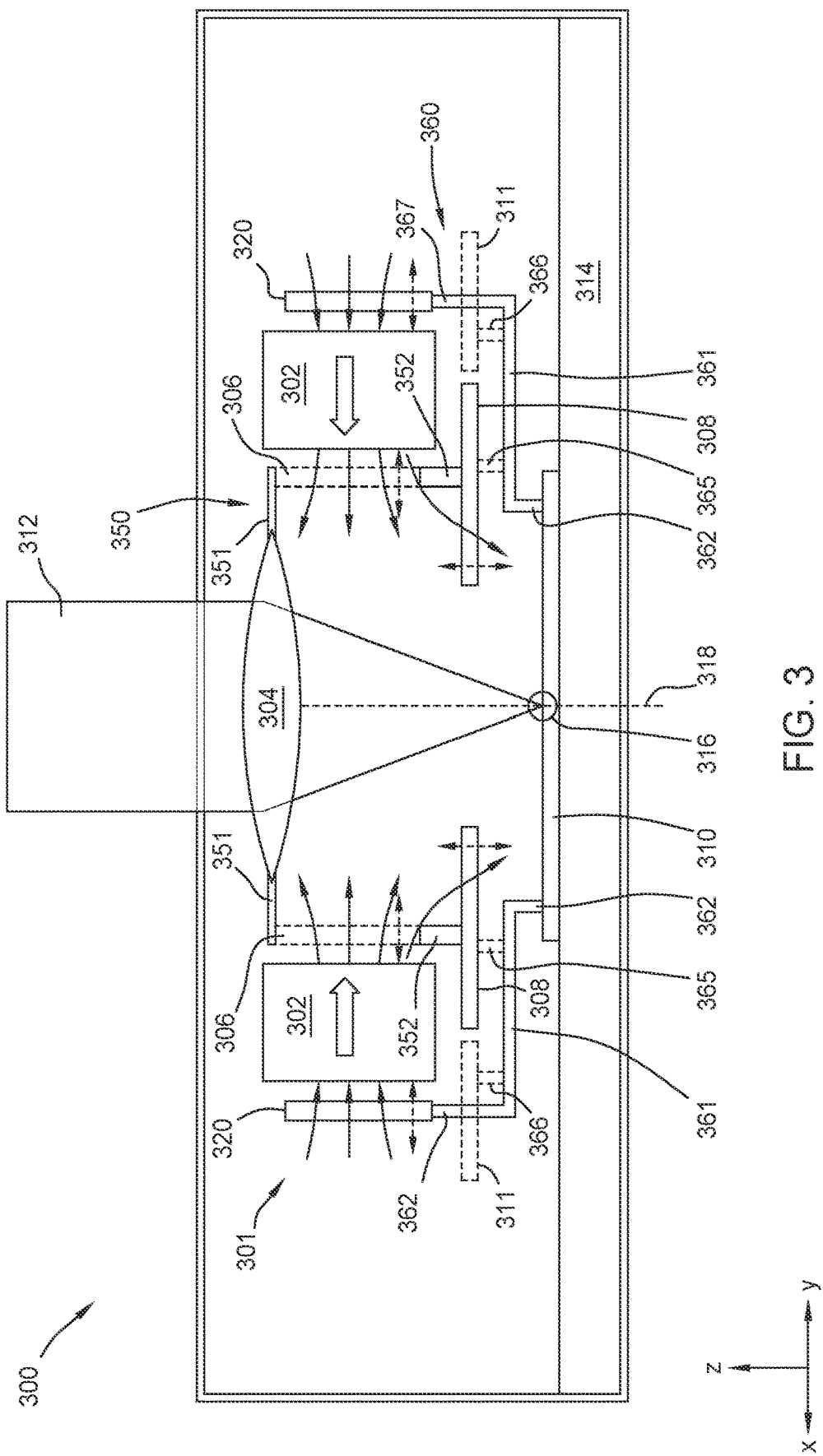
FIG. 3 is a schematic illustration of a side view of a camera system including an optical device, according to disclosed embodiments.

FIG. 3 is a schematic illustration of a side view of a camera system 300 including an optical device 301, according to disclosed embodiments. The camera system 300 may be similar to the camera 104 shown in FIG. 1 and/or the camera system 200 shown in FIG. 2, and may include one or more of the aspects, components, features, and/or properties thereof. The camera system 300 includes a lens 304, a plurality of magnets 302 disposed about the lens 304, a first plurality of vertical coil structures 306, a first plurality of horizontal coil structures 308, a second plurality of horizontal coil structures 311, an image sensor 310, and a base 314. The camera system 300 may be used as the camera system 200 shown in FIG. 2, and the base 314 may be used as the base 224 of FIG. 2. In the descriptions herein, vertical coil structures (such as the second plurality of vertical coil structures 306) may be referred to as lens OIS coils 306, vertical coil structures (such as the first plurality of vertical coil structures 320) may be referred to as image sensor OIS coils 320, horizontal coil structures (such as the first plurality of horizontal coil structures 308) may be referred to as lens AF coils 308, and horizontal coil structures (such as the second plurality of horizontal coil structures 311) may be referred to as image sensor AF coils 311, for exemplary purposes.

In the descriptions herein, for exemplary purposes, the first plurality of vertical coil structures 320 may be referred to as a first plurality of OIS coils, the second plurality of vertical coil structures 306 may be referred to as a second plurality of OIS coils, the first plurality of horizontal coil structures 308 may be referred to as a first plurality of AF coils, and the second plurality of horizontal coil structures 311 may be referred to as a second plurality of AF coils.

The plurality of lens OIS coils 306 are oriented along and coiled in one or more vertical planes (e.g., vertical planes parallel to the y-z plane) and the plurality of lens AF coils 308 are oriented along and coiled in one or more horizontal planes (e.g., horizontal planes parallel to the x-y plane). Furthermore, the plurality of image sensor OIS coils 320 are oriented along and coiled in one or more vertical planes (e.g., vertical planes parallel to the y-z plane) parallel to the plurality of lens OIS coils 306. The plurality of image sensor AF coils 311 are oriented along and coiled in one or more horizontal planes (e.g., horizontal planes parallel to the x-y plane) parallel to the plurality of lens AF coils 308. The vertical planes and the horizontal planes are perpendicular to each other. The image sensor 310 is disposed below the lens 304 and the one or more magnets 302 are disposed about the lens. In one embodiment, which can be combined with other embodiments, the lens 304 is operably coupled to one or more LiDAR sensors.

In FIG. 3, two magnets 302 are illustrated; however, more than two magnets, such as any amount of magnets between about two magnets to about eight magnets (such as four magnets), may be applicable to the embodiments disclosed. Furthermore, two lens OIS coils 306, two image sensor OIS coils 320, two lens AF coils 308, and image sensor AF coils 311 are illustrated; however, more than two lens OIS coils 306, such any amount of lens OIS coils 306 between about two lens OIS coils to about eight lens OIS coils (such as four lens OIS coils), more than two image sensor AF coils 311, such any amount of image sensor AF coils 311 between about two image sensor AF coils to about eight image sensor AF coils (such as four image sensor AF coils), and more than two lens AF coils 308, such as any amount of lens AF coils between about two lens AF coils to about eight lens AF coils (such as four lens AF coils), may be applicable to the embodiments disclosed. Furthermore, more than two image sensor OIS coils 320, such as any amount of image sensor OIS coils between about one image sensor OIS coil to about eight IS coils (such as a four image sensor OIS coils), may be applicable to the embodiments disclosed.

As light 312 passes through the lens 304 that may include one or more lenses, the light 312 is refracted and converged to a central point 316 (e.g., a principal focus) on the image sensor 310. In one embodiment, which can be combined with other embodiments, the image sensor 310 is coupled to a gyroscope. The vertical axis at the central point 316 may be referred to as the optical axis 318 of the image sensor 310. Images recorded when the central point 316 of the converged light 312 intersects the image sensor 310 may generally be of better quality than the images recorded when the central point 316 of the converged light 312 does not intersect the image sensor 310.

In order to adjust where the central point 316 of the light 312 is located, the lens OIS coils 306, the image sensor OIS coils 320, the lens AF coils 308, and the image sensor AF coils 311 are utilized. The lens 304 is attached to a first magnetically suspended structure 350 that is movable in the x-y plane and/or the z-direction. The first magnetically suspended structure 350 includes horizontal members 351 coupled between the lens 304 and the lens OIS coils 306 and vertical members 352 coupled between the lens OIS coils 306 and the lens AF coils 308.

The movement of the lens 304 and/or the image sensor 310 along the x-y plane and/or the z-direction may be used to minimize the shake or vibration of the camera during camera operation. The lens 304 may be moved along the x-y plane and/or the z-direction utilizing the one or more lens OIS coils 306, indicated by the dashed arrows intersecting the lens OIS coils 306. Furthermore, the lens 304 may be moved along the z-direction to change the position of the central point 316 of the light 312 by utilizing the one or more lens AF coils 308 (indicated by the dashed arrows intersecting the lens AF coils 308).

The image sensor 310 is movably disposed in the optical device 301, and the image sensor 310 is movable relative to the lens 304. The image sensor 310 may be shifted either in the x-direction, the y-direction, both the x-direction and the y-direction, and/or the z-direction. The image sensor 310 is coupled to the plurality of image sensor OIS coils 320 and the plurality of the image sensor AF coils 311 through a second magnetically suspended structure 360 that is moveable in the x-y plane and/or along the z-axis. The second magnetically suspended structure 360 may be independently movable relative to the first magnetically suspended structure 350 or coupled to the first magnetically suspended structure 350. The image sensor 310 is moved using the image sensor OIS coils 320 (indicated by the dashed arrows intersecting the image sensor OIS coils 320) parallel to the x-y plane to better orient the image sensor 310 relative to the optical axis 318 and the central point 316 of the light 312. The second magnetically suspended structure 360 includes horizontal members 361 and vertical members 367 coupled between the image sensor 310 and the image sensor OIS coils 320. The image sensor 310 is also moved vertically using the image sensor AF coils 311. The image sensor 310 may move translationally vertically along the Z-axis and/or may tilt relative to the Z-axis and/or the optical axis 318 using the image sensor AF coils 311. The second magnetically suspended structure 360 includes vertical members 366 coupled between the image sensor AF coils 311 and the horizontal members 361.

In one embodiment which can be combined with other embodiments, the first magnetically suspended structure 350 and the second magnetically suspended structure 360 are part of a single magnetically suspended structure. In one embodiment, which can be combined with other embodiments, the optical device 301 includes optional vertical members 365 coupled between the horizontal members 361 and the lens AF coils 308. In one embodiment, which can be combined with other embodiments, the optional vertical members 365 are omitted such that the first magnetically suspended structure 350 is moved and controlled independently of movement and control of the second magnetically suspended structure 362.

During operation, electric power is applied to the lens OIS coils 306, the image sensor OIS coils 320, the image sensor AF coils 311, and the lens AF coils 308 to energize the coils and generate magnetic fields. Each magnet 302 has a magnetic field traveling from the south pole to the north pole of the magnet (indicated by the arrows extending through the magnets 302). Based on the Lorentz forces generated between the magnets 302 and current in either the lens OIS coils 306, the image sensor OIS coils 320, the lens AF coils 308, or the image sensor AF coils 311, or all of the lens OIS coils 306, the lens AF coils 308, the image sensor AF coils 311, and the image sensor OIS coils 320 are either attracted or repelled by the magnets 302. Movement of the lens OIS coils 306, the image sensor OIS coils 320 the lens AF coils 308, and/or the image sensor AF coils 311 using the magnets 302 facilitate movement of the first magnetically suspended structure 350 and/or the second magnetically suspended structure 360.

By adjusting the current (e.g., electrical power) traveling through either the lens OIS coils 306, the lens AF coils 308, or both the lens OIS coils 306 and the lens AF coils 308, the lens 304 may be moved to a position relative to the image sensor 310 to realize OIS and/or AF corrections. Each of the plurality of lens AF coils 308 may have capability to have differing electrical power, such that one lens AF coil 308 may move independently of another lens AF coil 308 to generate a lens 304 tilt, such as a tilt of the optical axis 318 of the lens 304 relative to a vertical axis (e.g., the z-axis).

Furthermore, by adjusting the current (e.g., electrical power) traveling through either the image sensor OIS coils 320, the image sensor AF coils 311, or both the image sensor AF coils 311 and the image sensor OIS coils 320, the image sensor 310 may be moved to a position relative to the lens 304 to realize OIS and/or AF corrections. Each of the plurality of image sensor OIS coils 320 may have capability to have differing electrical power, such that one image sensor OIS coil 320 may move independently of another image sensor OIS coil 320 to generate an image sensor 310 shift, such as a shift along the x-y plane relative to the lens 304. Each of the plurality of image sensor AF coils 311 may have capability to have differing electrical power, such that one image sensor AF coil 311 may move independently of another image sensor AF coil 311 to generate an image sensor 310 shift, such as a shift along the z-axis relative to the lens 304 and/or a tilt relative to the z-axis.

Misalignment (e.g., non-parallelism) between the lens 304 and the image sensor 310 or motion from the camera device during operation may be remedied by utilizing a lens 304 tilt or shift and/or by utilizing an image sensor 310 tilt or shift. Furthermore, the lens may be tilted to achieve a wider angle of view for the camera system during device operation.

In one embodiment, which can be combined with other embodiments, the lens AF coils 308 and the lens OIS coils 306 may be used to control horizontal movement, vertical movement, and/or tilt of the lens 304 independently of the image sensor OIS coils 320 and the image sensor AF coils 311 controlling horizontal movement, vertical movement, and/or tilt of the image sensor 310.

Figure 4A:
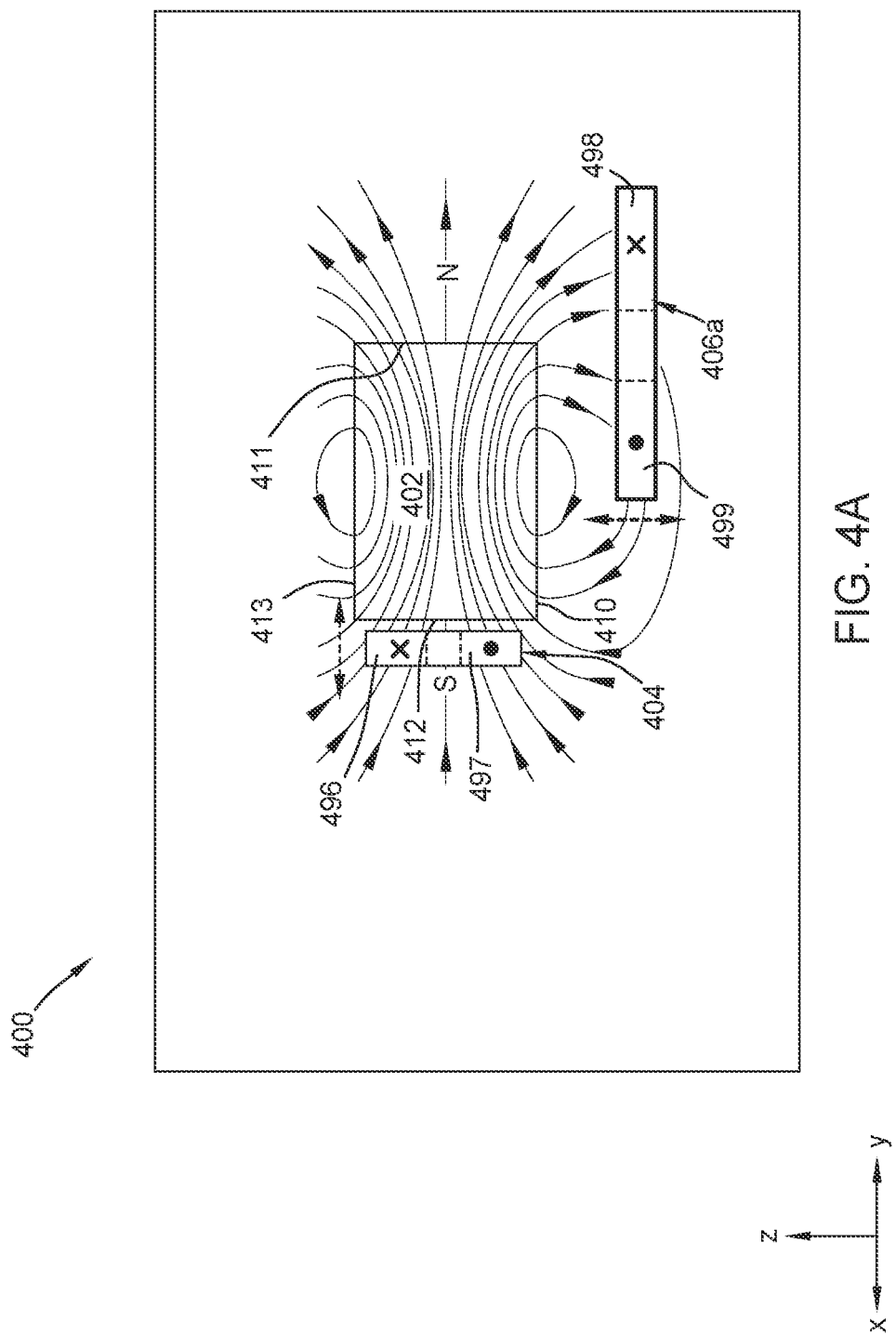
FIGS. 4A-4C are schematic illustrations of side views of multiple coil arrangements of an optical device of a camera system, according to disclosed embodiments.
Figure 4B:
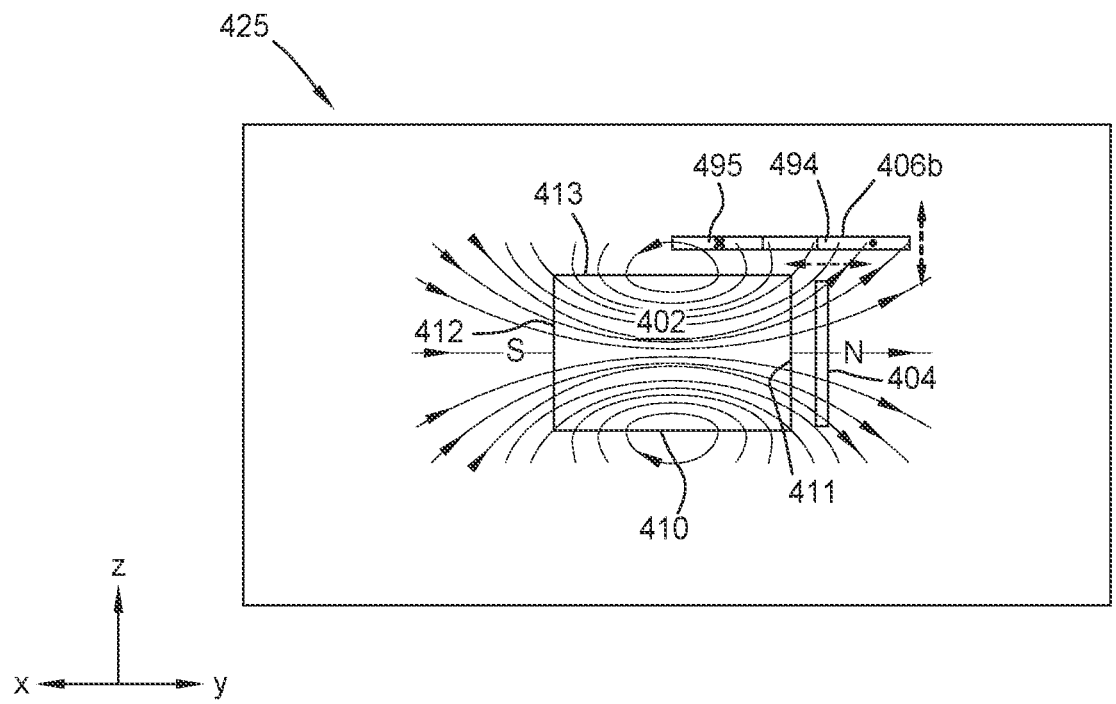
Figure 4C:
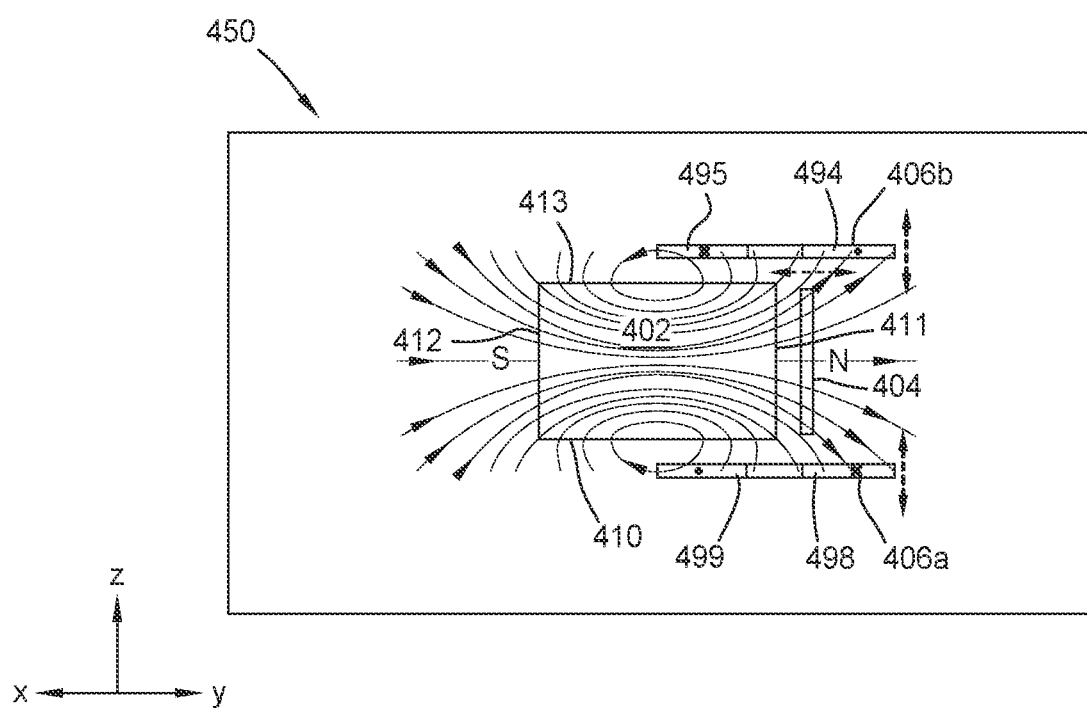

FIGS. 4A-4C are schematic illustrations of side views of multiple coil arrangements 400, 425, 450 of an optical device of a camera system, according to disclosed embodiments. The multiple coil arrangements 400, 425, 450 may be used in the device 100, the camera system 200, and/or the camera system 300 described herein. In the multiple coil arrangements 400, 425, 450, a magnetic field of a magnet 402 of a plurality of magnets is illustrated by the solid arrows traveling from a south pole S to a north pole N of the magnet 402. Though the multiple coil arrangements 400, 425, 450 illustrate a single magnet 402, the disclosed embodiments may reflect on some or all of the plurality of magnets of a camera system. In the embodiments discussed, the AF coils may be used as either lens AF coils or image sensor AF coils, and the OIS coils may be used as either AF OIS coils or image sensor OIS coils. The AF coils adjust the lens or image sensor along the z-direction and the OIS coils adjust the lens or image sensor along the x-y plane.

In FIG. 4A, the multiple coil arrangement 400 includes an OIS coil 404 and a first AF coil 406a. The OIS coil 404 is disposed outwardly of an outer surface 412 of the respective magnet 402 and is coiled in a vertical plane (in the Z-direction) and disposed adjacent to the magnet 402. The present disclosure contemplates that the OIS coils 404 may be disposed inwardly of inner surfaces such as an inner surface 411 of the respective magnets 402. The first AF coil 406a is coiled in a horizontal plane (in the X-Y plane) and is disposed at least partially below a lower surface 410 of the magnet 402. The first AF coil 406a includes a first portion 499 aligned vertically under the magnet 402 and a second portion 498 aligned inwardly of the inner surface 411 of the magnet 402. An outward end of the first portion 499 is aligned vertically under a center of the magnet 402. A center of the first AF coil 406a in the x-y plane is aligned vertically under the inner surface 411 of the magnet 402. Electrical current flows through the first AF coil 406a in a loop. Hence, the electrical current flows in a direction out of the page when flowing through the first portion 499 (denoted by a dot), and the electrical current flows in a direction into the page when flowing through the second portion 498 (denoted by an "x"). The dot and x convention for current flow directions will be used in this and other figures. The OIS coil 404 includes a first portion 497 through which electrical current flows in a direction out of the page, and a second portion 496 through which the electrical current flows in a direction into the page.

In one embodiment, which can be combined with other embodiments, the first portion 499 the first AF coil 406a is aligned outwardly of the outer surface 412 of the magnet 402, and the second portion 498 is aligned vertically under the magnet 402 and inwardly of the outer surface 412 of the magnet 402. In such an embodiment, the center of the first AF coil 406a is aligned vertically under the outer surface 412 of the respective magnet 402. The positions of the first AF coil 406a facilitate magnetic field experienced by the first AF coil 406a being larger, facilitating efficiency and less electrical power (e.g., current) needed for the first AF coil 406a. The positions of the first AF coil 406a facilitate the first AF coil 406a experiencing less stray magnetic field and experiencing more direct magnetic field to move (e.g., vertically), the first AF coil 406a.

In the multiple coil arrangement 425 shown in FIG. 4B, the multiple coil arrangement 425 includes the OIS coil 404 and a second AF coil 406b. The first AF coil 406a may be omitted in the multiple coil arrangement 425 shown in FIG. 4B. The OIS coil 404 is disposed inwardly of the inner surface 411 and is coiled in a vertical plane and disposed adjacent to the magnet 402. The second AF coil 406b is disposed at least partially above an upper surface 413 of the magnet 402. The second AF coil 406b includes a first portion 495 aligned vertically above the magnet 402 and a second portion 494 aligned inwardly of the inner surface 411 of the magnet 402. An outward end of the first portion 495 is aligned vertically above a center of the magnet 402. A center of the second AF coil 406b is aligned vertically above the inner surface 411 of the magnet 402. Electrical current flows through the second AF coil 406b in a loop. Hence, the electrical current flows in a direction out of the page when flowing through the second portion 494, and the electrical current flows in a direction into the page when flowing through the first portion 495.

In one embodiment, which can be combined with other embodiments, the first portion 495 of the second AF coil 406b is aligned outwardly of the outer surface 412 of the magnet 402 and the second portion 494 is aligned vertically above the magnet 402 and inwardly of the outer surface 412 of the magnet 402. In such an embodiment, the center of the second AF coil 406b is aligned vertically above the outer surface 412 of the respective magnet 402.

In the multiple coil arrangement 450 shown in FIG. 4C, the multiple coil arrangement 450 includes the OIS coil 404, the first AF coil 406a shown in FIG. 4A, and the second AF coil 406b shown in FIG. 4B and disposed at least partially above the first AF coil 406A. The two AF coils 406a, 406b may operate in unison to move the lens in the z-direction more quickly or along a greater distance than by using only one AF coil, such as only a first AF coil 406a or only a second AF coil 406b.

In the multiple coil arrangements 400, 425, 450, the centers of the AF coils 406a, 406b can be aligned with the inner surfaces 411 or the outer surfaces 412 of the respective magnets 402. In the multiple coil arrangements 400, 425, 450, outward ends of the first portions 499, 495 of the AF coils 406a, 406b are aligned vertically above or vertically below the center of the respective magnet 402, which results in a larger magnetic force experienced by the AF coils 406a, 406b (as shown by the higher density of magnetic field lines in the figures in those regions) using the electrical power and the magnets 402. The larger magnetic forces experienced by the AF coils 406a, 406b facilitate energy efficiency and less electrical power (e.g., current) needed for the AF coils 406a, 406b. The positions of the AF coils 406a, 406b facilitate the AF coils 406a, 406b experiencing less stray magnetic field and experiencing more direct magnetic field to move (e.g., vertically), the AF coils 406a, 406b.

The magnet 402 may have one or more AF coils 406a, 406b associated with the magnet 402, where each AF coil 406a, 406b of different magnets 402 may operate independently of each other. The OIS coils 404 may be aligned inwardly of the inner surfaces 411 of the magnets 402.

FIGS. 5-13 are schematic illustrations of top views of positionings of pluralities of magnets and pluralities of coils, according to disclosed embodiments. The locations of the pluralities of magnets 520a-d, 620a-d, 720a-d, 820a-d, 920a-d, 1020a-d, 1120a-d, 1220a-h, 1320a-c, the locations of the pluralities of AF coils 522a-d, 622a-d, 722a-d, 822, 922, 1022a-d, 1122a-d, 1222e-h, 1322a-c, and the locations of the pluralities of OIS coils 524a-d, 624a-d, 724a-d, 824a-d, 924a-d, 1024a-d, 1124a-d, 1224a-d, 1324a-c are intended to show a general area that the component may be within an optical device of a camera system. Variations in the locations may be applicable in embodiments not specifically illustrated in FIG. 5-13. The magnets shown in FIGS. 5-13 are magnetized horizontally toward a lens (such as the lens 304).

In the embodiments shown in FIGS. 5-13, the AF coils 522a-d, 622a-d, 722a-d, 822, 922, 1022a-d, 1122a-d, 1222e-h, 1322a-c are for vertical movement, such as vertical translation and/or tilting. The AF coils 522a-d, 622a-d, 722a-d, 822, 922, 1022a-d, 1122a-d, 1222e-h, 1322a-c shown can be used for vertical movement of a lens (such as the lens 304) and/or vertical movement of an image sensor (such as the image sensor 310). In the embodiments shown in FIGS. 5-13, the OIS coils 524a-d, 624a-d, 724a-d, 824a-d, 924a-d, 1024a-d, 1124a-d, 1224a-d, 1324a-c are for horizontal movement, such as horizontal movement along the x-y plane. The OIS coils 524a-d, 624a-d, 724a-d, 824a-d, 924a-d, 1024a-d, 1124a-d, 1224a-d, 1324a-c shown can be used for horizontal movement of a lens (such as the lens 304) and/or horizontal movement of an image sensor (such as the image sensor 310). The present disclosure contemplates that the lens may be moved horizontally and/or vertically while the image sensor is stationary. The present disclosure contemplates that the image sensor may be moved horizontally and/or vertically while the lens is stationary. The present disclosure contemplates that the image sensor may be moved horizontally and/or vertically while the lens is moved horizontally and/or vertically. The present disclosure also contemplates that the lens is moved one of vertically or horizontally while the image sensor is moved the other of vertically or horizontally. In one embodiment, which can be combined with other embodiments, the AF coils 522a-d, 622a-d, 722a-d, 822, 922, 1022a-d, 1122a-d, 1222e-h, 1322a-c are used to vertically move a lens while the OIS coils 524a-d, 624a-d, 724a-d, 824a-d, 924a-d, 1024a-d, 1124a-d, 1224a-d, 1324a-c are used to horizontally move an image sensor. In one embodiment, which can be combined with other embodiments, the AF coils 522a-d, 622a-d, 722a-d, 822, 922, 1022a-d, 1122a-d, 1222e-h, 1322a-c are used to vertically move an image sensor while the OIS coils 524a-d, 624a-d, 724a-d, 824a-d, 924a-d, 1024a-d, 1124a-d, 1224a-d, 1324a-c are used to horizontally move a lens.

Each of AF coils 522a-d, 622a-d, 722a-d, 822, 922, 1022a-d, 1122a-d, 1222e-h, 1322a-c of the FIGS. 5-13 may operate independently of each other, such that one or more AF coils of an embodiment may have a different electrical power than another one or more AF coils of the same embodiment. The non-uniform electrical power supplied to the one or more AF coils (e.g., a different electrical power supplied to at least one, but not all AF coils) may generate a lens tilt in the z-axis, such that the tilt changes the positioning of the center point (e.g., principal focus) of a lens away from the center of the image sensor. Misalignment (e.g., non-parallelism) between the lens and the image sensor plane and achieving a wider angle of view may be compensated by utilizing a lens tilt.

Each of the plurality of OIS coils 524a-d, 624a-d, 724a-d, 824a-d, 924a-d, 1024a-d, 1124a-d, 1224a-d, 1324a-c of FIGS. 5-13 may operate independently of each other, such that one or more OIS coils of an embodiment may have a different electrical power than another one or more OIS coils of the same embodiment. The non-uniform electrical power supplied to the one or more OIS coils (e.g., a different electrical power supplied to at least one, but not all OIS coils) may generate an image sensor shift or a lens shift in the x-y plane to better align the optical axis relative to the image sensor.

Aspects of FIG. 3 and FIG. 4 may be similar or may be applicable to the embodiments discussed in FIGS. 5-13. For example, the AF coils 522a-d, 622a-d, 722a-d, 822, 922, 1022a-d, 1122a-d, 1222e-h, 1322a-c may either be partially disposed beneath respective adjacent magnets, be partially disposed above respective adjacent magnets, or both be partially disposed beneath respective adjacent magnets and be partially disposed above respective adjacent magnets. The magnets are disposed at corners or at sides of a shape, such as a rectangular shape or a triangular shape. Magnets located in a corner may have an octagonal shape (as shown for example in FIG. 5), such as a non-regular octagonal shape having a profile in the shape of an isosceles trapezoid. Magnets located along a side of a shape may have a rectangular shape (as shown for Example in FIG. 9). The previously listed shapes of the magnets are not intended to be limiting, but to provide an example of possible embodiments.

Figure 5:
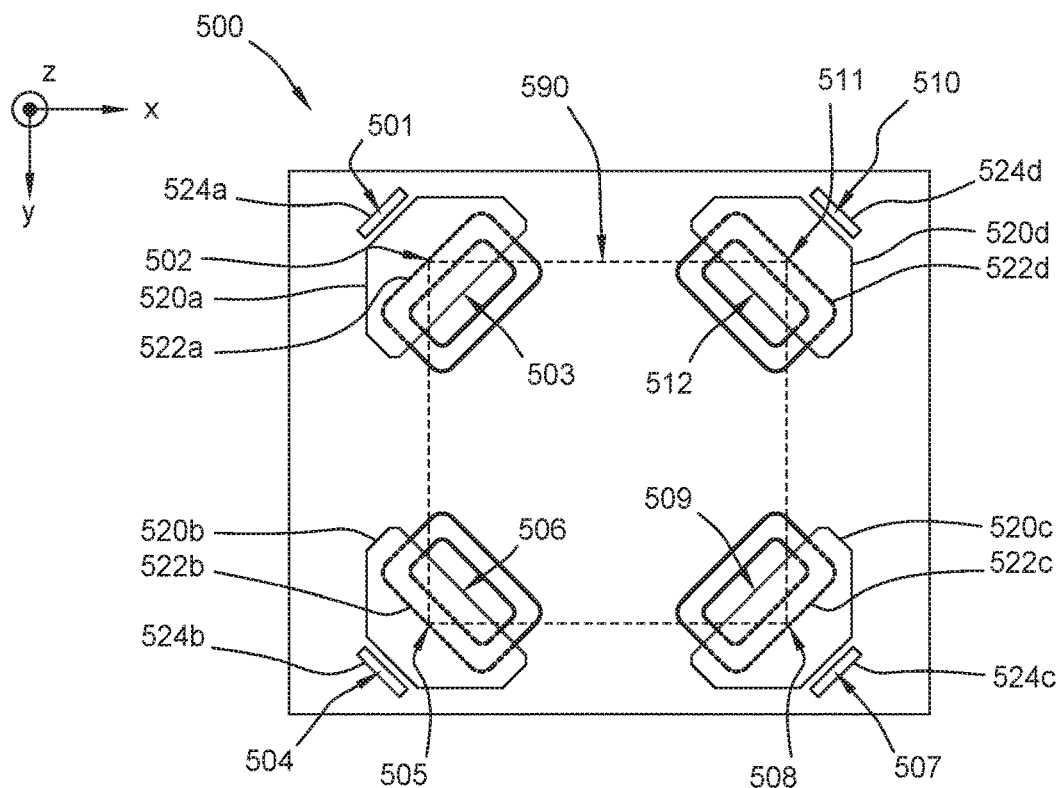
FIGS. 5-13 are schematic illustrations of top views of positionings of pluralities of magnets and pluralities of coils, according to disclosed embodiments.

FIG. 5 illustrates a schematic top view of a multiple coil arrangement 500 of an optical device, according to disclosed embodiments. The multiple coil arrangement 500 includes four magnets 520a-d, four AF coils 522a-d, and four OIS coils 524a-d disposed along a rectangular pattern 590, such as a square pattern. The four magnets 520a-d are located at four corners of the square pattern. The first magnet 520a is located in a second location 502, the second magnet 520b is located in a fifth location 505, the third magnet 520c is located in an eighth location 508, and the fourth magnet 520d is located in an eleventh location 511. In one embodiment, which can be combined with other embodiments, centers of the four magnets 520a-d in the x-y plane are aligned with the four respective corners of the rectangular pattern 590.

A lens and/or an image sensor may be tilted when differing electrical power is applied to at least two of the AF coils of the plurality of AF coils 522a-d. When the same electrical power is applied to each of the plurality of AF coils 522a-d, the lens and/or the image sensor may be vertically moved parallel to the z-axis without tilting the lens and/or the image sensor. The electrical power (e.g., current) applied to each AF coil of the plurality of AF coils 522a-d and each OIS coil of the plurality of OIS coils 524a-d may be calibrated for various OIS positions, AF positions, and tilt angles.

In one embodiment, which can be combined with other embodiments, the AF coils 522a-d are disposed at gaps from each other, and the OIS coils 524a-d are disposed at gaps from each other.

The first AF coil 522a associated with the first magnet 520a is located in a third location 503 or inwardly of the third location 503. The second AF coil 522b associated with the second magnet 520b is located in a sixth location 506 or inwardly of the sixth location 506. The AF lens coil 522c associated with the third magnet 520c is located in a ninth location 509 or inwardly of the ninth location 509. The fourth AF coil 522d associated with the fourth magnet 520d is located in a twelfth location 512 or inwardly of the twelfth location 512.

The first OIS coil 524a associated with the first magnet 520a is located in a first location 501. The second OIS coil 524b associated with the second magnet 520b is located in a fourth location 504. The third OIS coil 524c associated with the third magnet 520c is located in a seventh location 507. The fourth OIS coil 524d associated with the fourth magnet 520d is located in a tenth location 510.

In one embodiment, which can be combined with other embodiments, the magnets and coils located at, inwardly of, outwardly of, or between the respective locations 501-512 are disposed at, inwardly of, outwardly of, or between the respective locations 501-512 such that centers in the x-y plane of the magnets and coils are aligned with, inwardly of, outwardly of, or between the respective locations 501-512.

In one embodiment, which can be combined with other embodiments, centers of the AF coils 522a-d in the x-y plane are vertically offset from centers of the respective adjacent magnets 520a-d in the x-y plane.

A surface (such as a lower surface) of each of one or more magnets of the plurality of magnets 520a-d faces a respective AF coil of the plurality of AF coils 522a-d. The surface of the magnet 520a-d includes a first surface area, and the respective AF coil 522a-d includes a second surface area facing the surface of the respective magnet. The second surface area is a ratio R of the first surface area, and the ratio R is within a range of 0.8 to 1.2.

Figure 6:
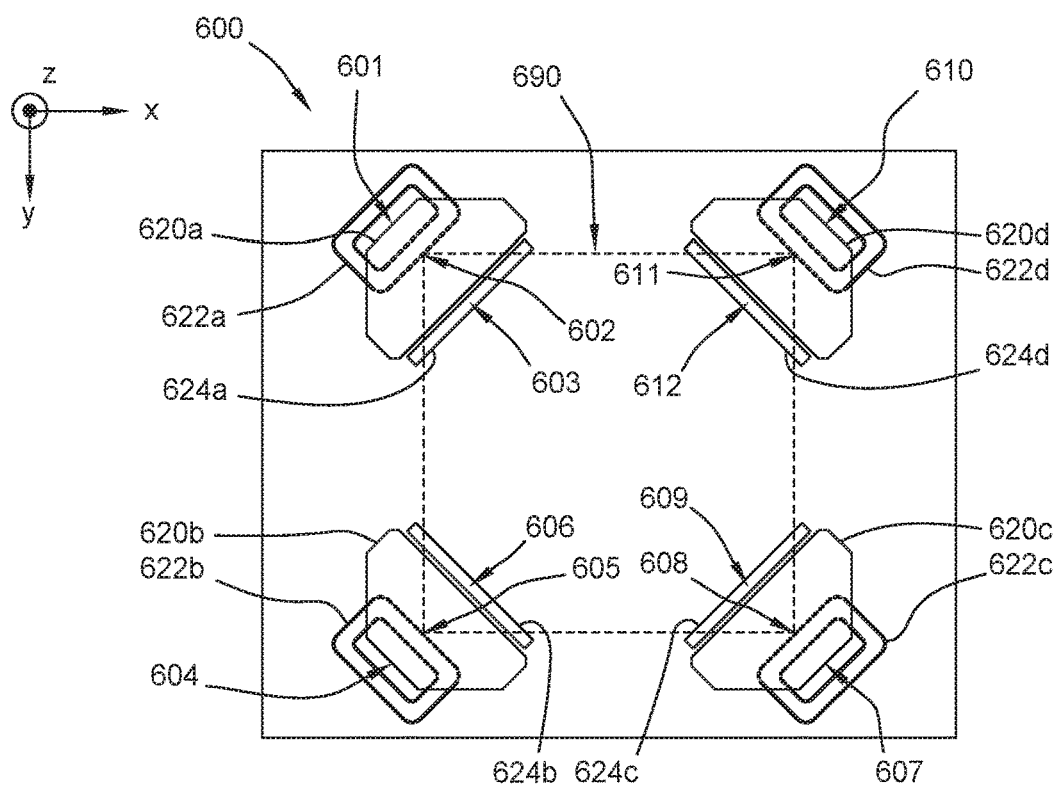

FIG. 6 illustrates a schematic top view of a multiple coil arrangement 600 of an optical device, according to disclosed embodiments. The multiple coil arrangement 600 includes four magnets 620a-d, four AF coils 622a-d, and four OIS coils 624a-d disposed along a square pattern 690. The four magnets 620a-d are located at the corners of the square pattern 690. The first magnet 620a is located in a second location 602, the second magnet 620b is located in a fifth location 605, the third magnet 620c is located in an eighth location 608, and the fourth magnet 620d is located in an eleventh location 611.

The first AF coil 622a associated with the first magnet 620a is located in a first location 601 or outwardly of the first location 601 The second AF coil 622b associated with the second magnet 620b is located in a fourth location 604 or outwardly of the fourth location 604 The third AF coil 622c associated with the third magnet 620c is located in a seventh location 607 or outwardly of the seventh location 607. The fourth AF coil 622d associated with the fourth magnet 620d is located in a tenth location 610 or outwardly of the tenth location 610.

The first OIS coil 624a associated with the first magnet 620a is located in a third location 603. The second OIS coil 624b associated with the second magnet 620b is located in a sixth location 606. The third OIS coil 624c associated with the third magnet 620c is located in a ninth location 609. The fourth OIS coil 624d associated with the fourth magnet 620d is located in a twelfth location 612.

Figure 7:
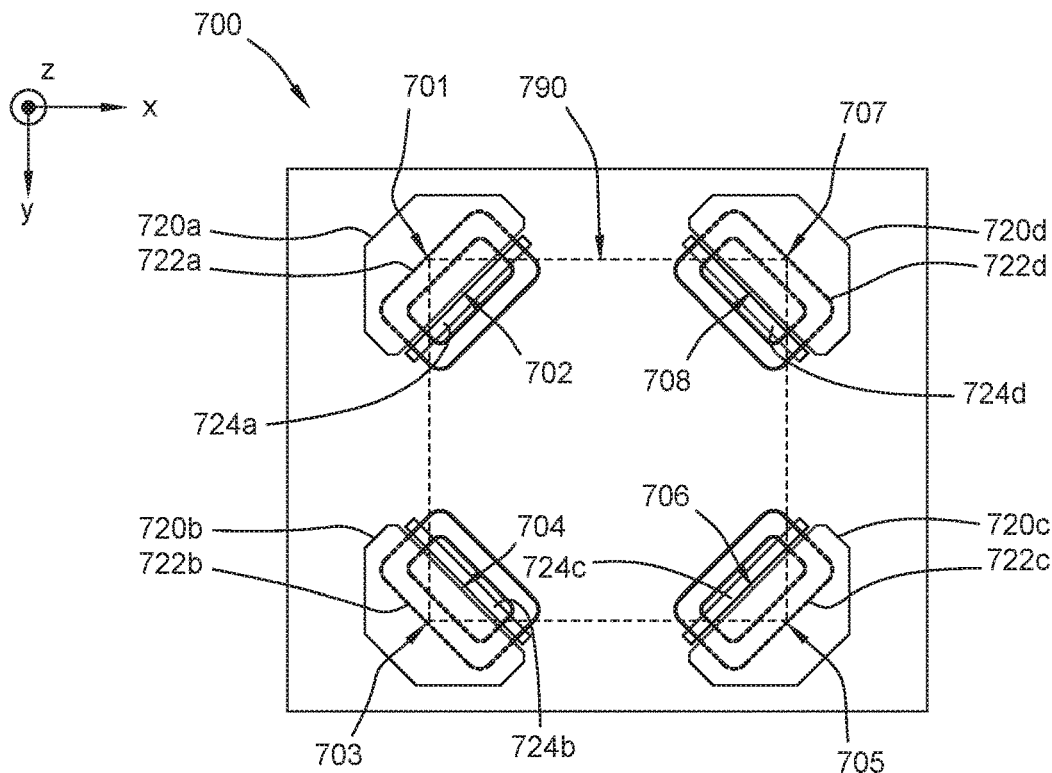

FIG. 7 illustrates a schematic top view of a multiple coil arrangement 700 of an optical device, according to disclosed embodiments. The multiple coil arrangement 700 includes four magnets 720a-d, four AF coils 722a-d, and four OIS coils 724a-d disposed along a square pattern 790. The four magnets 720a-d are disposed at the four corners of the square pattern 790. The first magnet 720a is located in a first location 701, the second magnet 720b is located in a third location 703, the third magnet 720c is located in an fifth location 705, and the fourth magnet 720d is located in a seventh location 707.

The first AF coil 722a associated with the first magnet 720a is located at a second location 702. The second AF coil 722b associated with the second magnet 720b is located at a fourth location 704. The third AF coil 722c associated with the third magnet 702c is located at a sixth location 706. The fourth AF coil 722d associated with the fourth magnet 720d is located at an eighth location 708.

The first OIS coil 724a associated with the first magnet 720a is located inwardly of the second location 702. The second OIS coil 724b associated with the second magnet 720b is located inwardly of the fourth location 704. The third OIS coil 724c associated with the third magnet 720c is located inwardly of the sixth location 706. The fourth OIS coil 724d associated with the fourth magnet 720d is located inwardly the eighth location 708.

Figure 8:
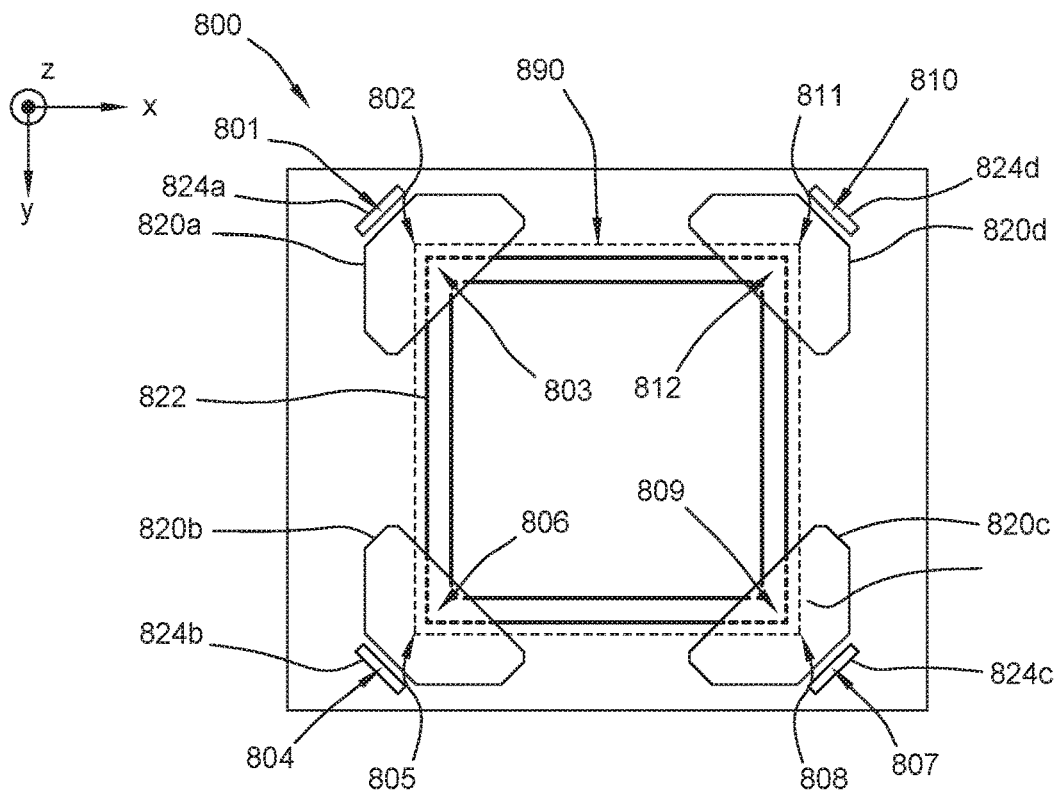

FIG. 8 illustrates a schematic top view of a multiple coil arrangement 800 of an optical device, according to disclosed embodiments. The multiple coil arrangement 800 includes four magnets 820a-d, an AF coil 822, and four OIS coils 824a-d disposed along a square pattern 890. The AF coil 822 is a single AF coil structure having coils coiled in a rectangular pattern. The four magnets 820a-d are disposed above or below four corners of the rectangular pattern of the single AF coil structure of the AF coil 822. The four magnets 820a-d are located at the four corners of the square pattern 890. The first magnet 820a is located in a second location 802, the second magnet 820b is located in a fifth location 805, the third magnet 820c is located in an eighth location 808, and the fourth magnet 820d is located in an eleventh location 811. The OIS coils 824a-d are disposed outwardly of outer surfaces of the magnets 820a-d. The present disclosure contemplates that the OIS coils 824a-d may be disposed inwardly of inner surfaces of the magnets 820a-d.

The AF coil 822 intersects the first magnet 820a at an area under the first magnet 820a at the third location 803, the second magnet 820b at an area under the second magnet 820b at the sixth location 806, the third magnet 820c at an area under the third magnet 820c at the ninth location 809, and the fourth magnet 820d at an area under the fourth magnet 820d at the twelfth location 812. The AF coil 822 follows the square pattern 890, and one of the four magnets 820a-d are located at each corner of the square pattern 890.

The first OIS coil 824a associated with the first magnet 820a is located in a first location 801. The second OIS coil 824b associated with the second magnet 820b is located in a fourth location 804. The third OIS coil 824c associated with the third magnet 820c is located in a seventh location 807. The fourth OIS coil 824d associated with the fourth magnet 820d is located in a tenth location 810.

Figure 9:
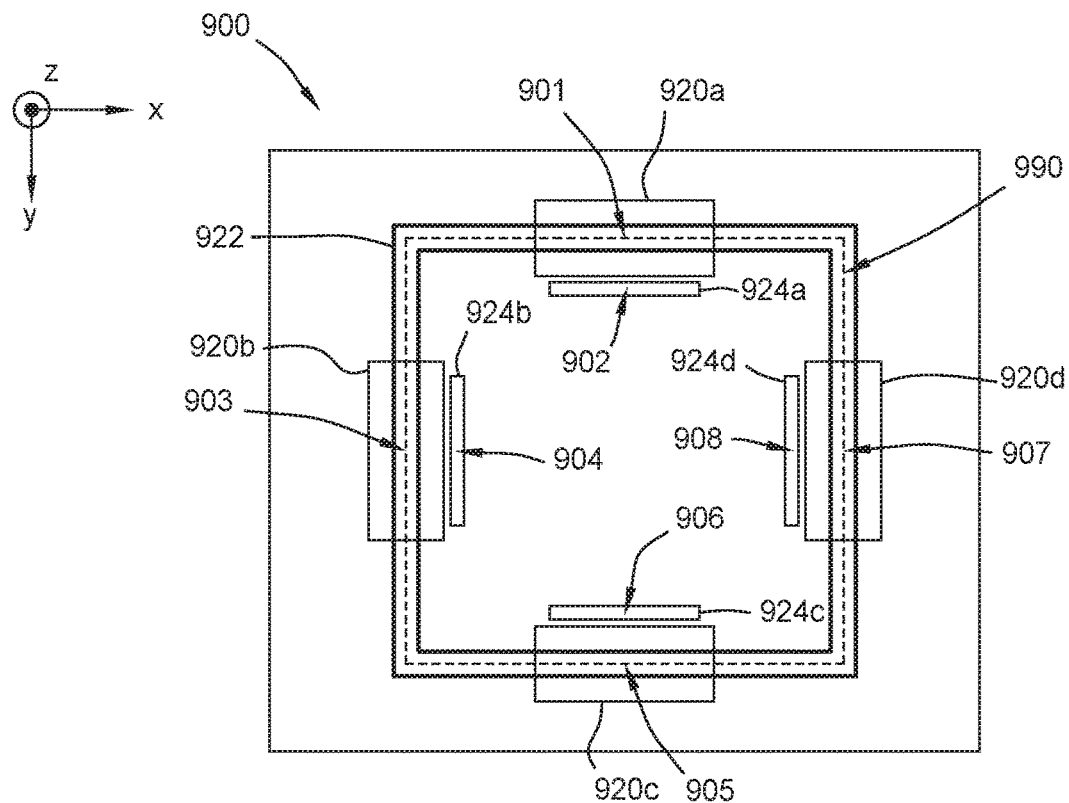

FIG. 9 illustrates a schematic top view of a multiple coil arrangement 900 of an optical device, according to disclosed embodiments. The multiple coil arrangement 900 includes four magnets 920a-d, an AF coil 922, and four OIS coils 924a-d disposed along a square pattern 990. The AF coil 922 is a single AF coil structure having coils in a rectangular pattern. The four magnets 920a-d are disposed above or below four sides of the rectangular pattern of the single AF coil structure of the AF coil 922. Each side of the square pattern 990 includes one of the four magnets 920a-d. The first magnet 920a is located in a first location 901, the second magnet 920b is located in a third location 903, the third magnet 920c is located in a fifth location 905, and the fourth magnet 920d is located in an seventh location 907.

The AF coil 922 intersects the first magnet 920a at an area under the first magnet 920a at the first location 901, the second magnet 920b at an area under the second magnet 920b at the third location 903, the third magnet 920c at an area under the third magnet 920c at the fifth location 905, and the fourth magnet 920d at an area under the fourth magnet 920d at the seventh location 907. The AF coil 922 follows the square pattern 990, and one of the four magnets 920a-d are located at each side of the square pattern 990.

The first OIS coil 924a associated with the first magnet 920a is located in a second location 902. The second OIS coil 924b associated with the second magnet 920b is located in a fourth location 904. The third OIS coil 924c associated with the third magnet 920c is located in a sixth location 906. The fourth OIS coil 924d associated with the fourth magnet 920d is located in an eighth location 908. The present disclosure contemplates that the OIS coils 924a-d may be disposed outwardly of outer surfaces of the magnets 920a-d.

Figure 10:
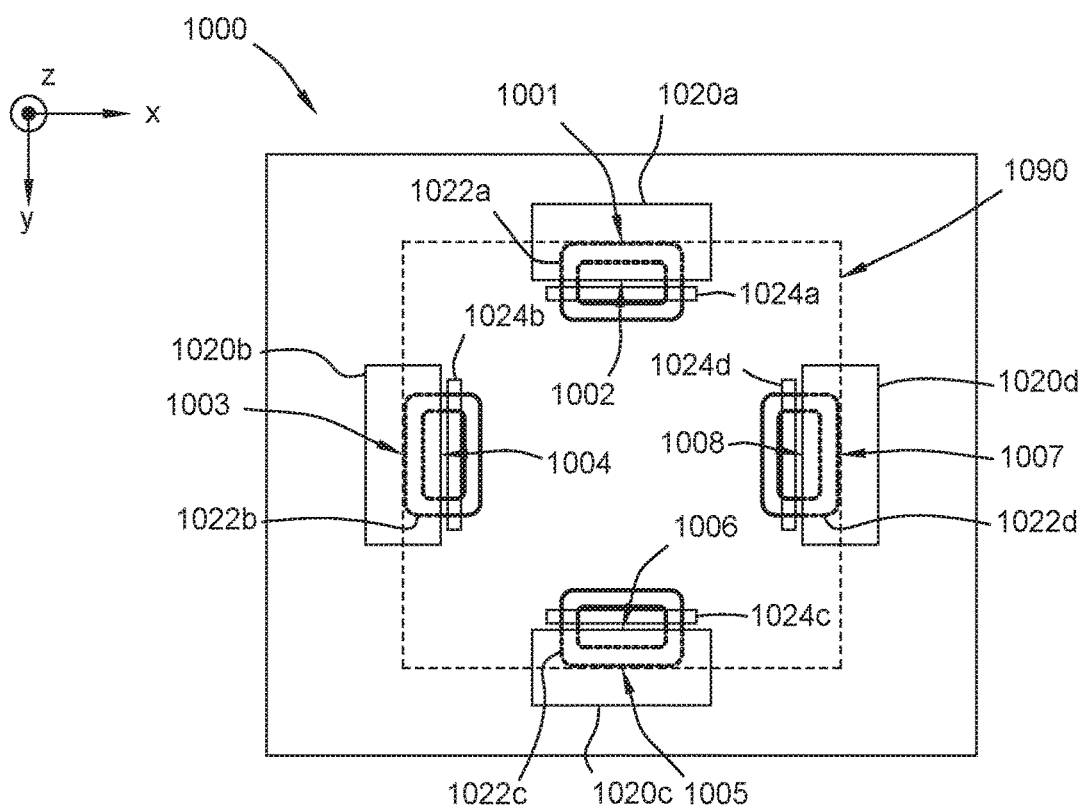

FIG. 10 illustrates a schematic top view of a multiple coil arrangement 1000 of an optical device, according to disclosed embodiments. The multiple coil arrangement 1000 includes four magnets 1020a-d, four AF coils 1022a-d, and four OIS coils 1024a-d disposed along a square pattern 1090. Each side of the square pattern 1090 includes one of the four magnets 1020a-d. The first magnet 1020a is located in a first location 1001, the second magnet 1020b is located in a third location 1003, the third magnet 1020c is located in a fifth location 1005, and the fourth magnet 1020d is located in a seventh location 1007. In one embodiment, which can be combined with other embodiments, centers of the four magnets 1020a-d in the x-y plane are aligned with the four respective sides of the square pattern 1090.

The OIS coils 1024a-d and the AF coils 1022a-d are disposed inwardly of inner surfaces of the magnets 1020a-d. The present disclosure contemplates that the OIS coils 1024a-d and the AF coils 1022a-d may be disposed outwardly of outer surfaces of the magnets 1020a-d.

The first AF coil 1022a associated with the first magnet 1020a is located in a second location 1002 or inwardly of the second location 1002. The second AF coil 1022b associated with the second magnet 1020b is located in a fourth location 1004 or inwardly of the fourth location 1004. The third AF coil 1022c associated with the third magnet 1020c is located in a sixth location 1006 or inwardly of the sixth location 1006. The fourth AF coil 1022d associated with the fourth magnet 1020d is located in an eighth location 1008 or inwardly of the eighth location 1008.

The first OIS coil 1024a associated with the first magnet 1002a is located inwardly of the second location 1002. The second OIS coil 1024b associated with the second magnet 1020b is located inwardly of the fourth location 1004. The third OIS coil 1024c associated with the third magnet 1020c is located inwardly of the sixth location 1006. The fourth OIS coil 1024d associated with the fourth magnet 1020d is located inwardly of the eighth location 1008.

Figure 11:
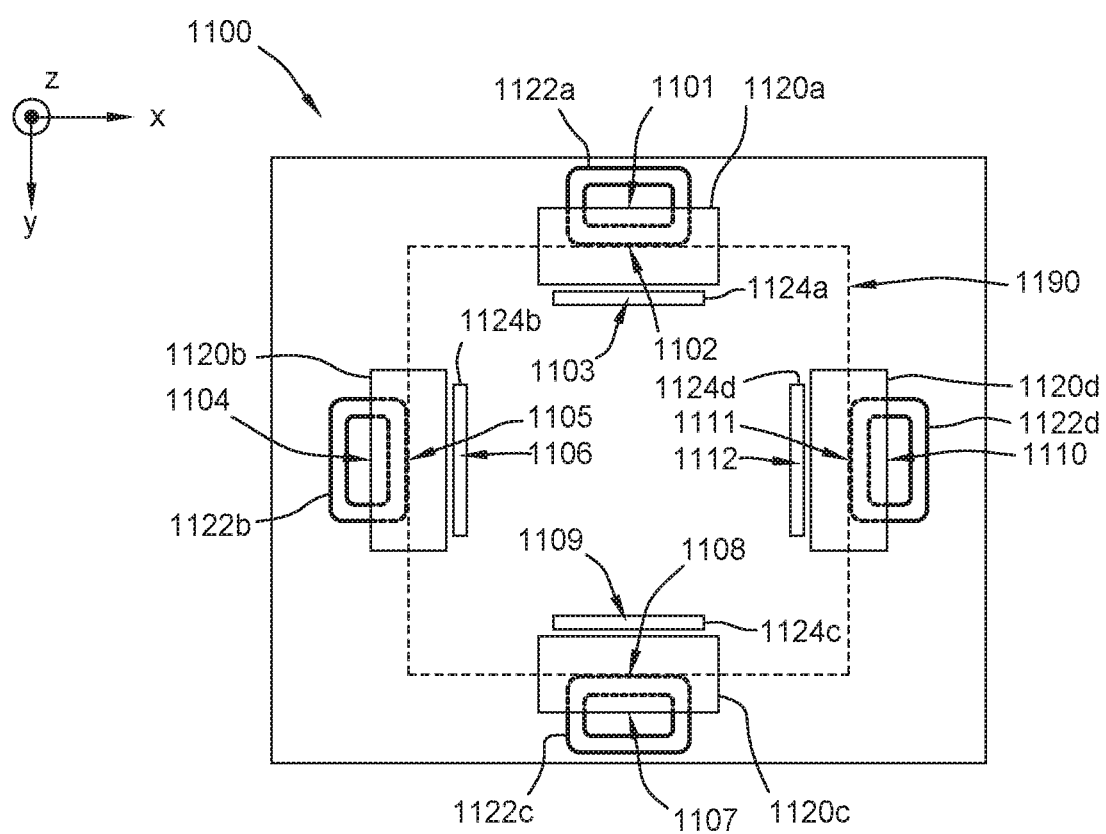

FIG. 11 illustrates a schematic top view of a multiple coil arrangement 1100 of an optical device, according to disclosed embodiments. The multiple coil arrangement 1100 includes four magnets 1120a-d, four AF coils 1122a-d, and four OIS coils 1124a-d disposed along a square pattern 1190. Each side of the square pattern 1190 includes one of the four magnets 1120a-d. The first magnet 1120a is located in a second location 1102, the second magnet 1120b is located in a fifth location 1105, the third magnet 1120c is located in an eighth location 1108, and the fourth magnet 1120d is located in an eleventh location 1111.

The OIS coils 1124a-d are disposed inwardly of inner surfaces of the magnets 1120a-d. The present disclosure contemplates that the OIS coils 1124a-d may be disposed outwardly of outer surfaces of the magnets 1120a-d.

The AF coils 1122a-d are disposed outwardly of outer surfaces of the magnets 1120a-d. The present disclosure contemplates that the AF coils 1122a-d may be disposed inwardly of inner surfaces of the magnets 1120a-d.

The first AF coil 1122a associated with the first magnet 1120a is located in a first location 1101 or outwardly of the first location 1101. The second AF coil 1122b associated with the second magnet 1120b is located in a fourth location 1104 or outwardly of the fourth location 1104. The third AF coil 1122c associated with the third magnet 1120c is located in a seventh location 1107 or outwardly of the seventh location 1107. The fourth AF coil 1122d associated with the fourth magnet 1120d is located in a tenth location 1110 or outwardly of the tenth location 1110.

The first OIS coil 1124a associated with the first magnet 1120a is located in a third location 1103. The second OIS coil 1124b associated with the second magnet 1120b is located in a sixth location 1106. The third OIS coil 1124c associated with the third magnet 1120c is located in a ninth location 1109. The fourth OIS coil 1124d associated with the fourth magnet 1120d is located in a twelfth location 1112.

Figure 12:
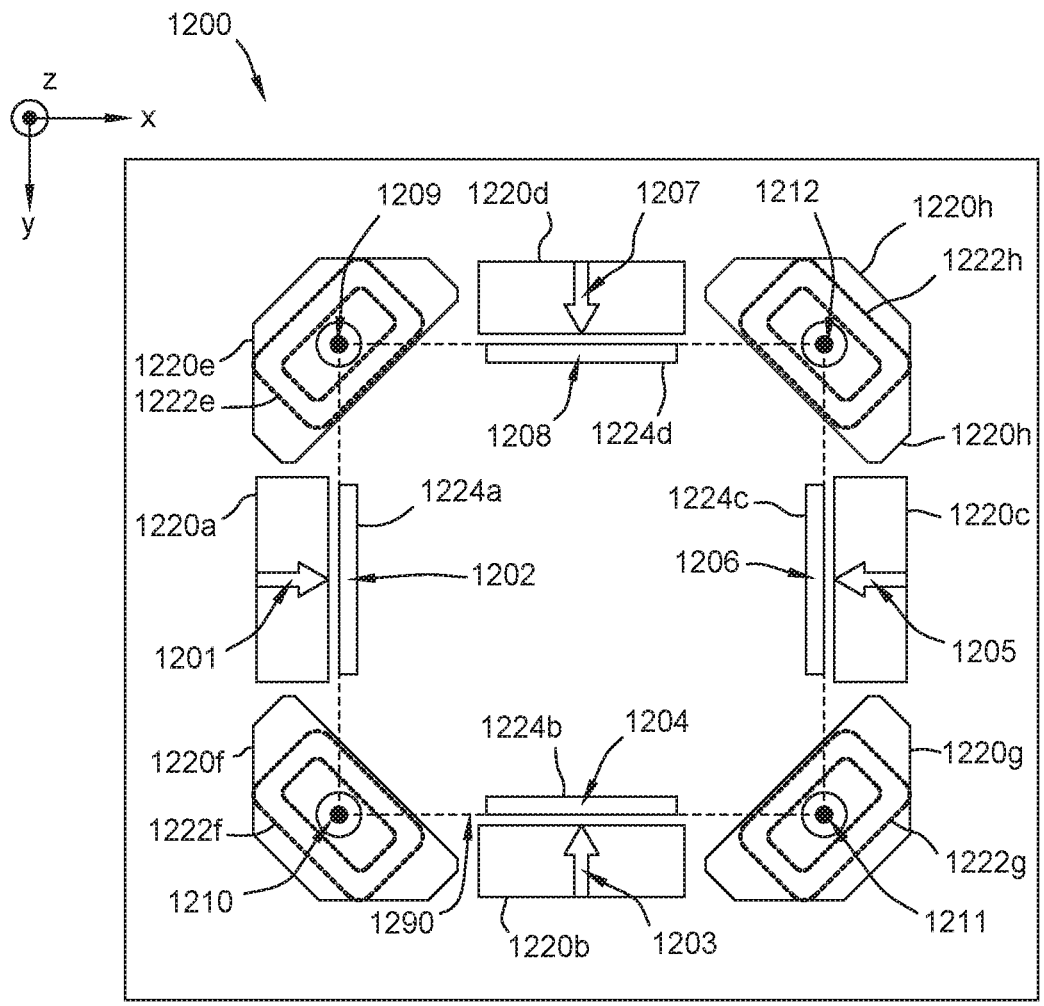

FIG. 12 illustrates a schematic top view of a multiple coil arrangement 1200 of an optical device, according to disclosed embodiments. The multiple coil arrangement 1200 includes eight magnets 1220a-h, four AF coils 1222e-h, and four OIS coils 1224a-d disposed along a square pattern 1290. A first plurality of magnets 1220e-h (four are shown) are disposed at four corners of the square pattern 1290. A second plurality of magnets 1220a-d (four are shown) are disposed at four sides of the square pattern 1290. A first magnet 1220a is located in a first location 1201, a second magnet 1220b is located in a third location 1203, a third magnet 1220c is located in a fifth location 1205, and a fourth magnet 1220d is located in a seventh location 1207. A fifth magnet 1220e is located in a ninth location 1209, a sixth magnet 1220f is located in a tenth location 1210, a seventh magnet 1220g is located in an eleventh location 1211, and an eighth magnet 1220h is located in a twelfth location 1212. The first plurality of magnets 1220e-h are non-regular octagonal in shape and the second plurality of magnets 1220a-d are rectangular in shape.

The second plurality of magnets 1220a-d located on each side of the square pattern 1290 are magnetized horizontally or vertically toward a lens (such as the lens 304) to generate magnetic fields horizontally in horizontal directions (or vertically in vertical directions) toward a center of the square pattern 1290 and toward the lens. A north pole of each magnet of the plurality of magnets 1220a-d faces inwardly towards the center (e.g., the lens location) of the square pattern 1290 and the south pole of each magnet of the plurality of magnets 1220a-d faces outwardly away from the center (e.g., the lens location) of the square pattern 1290. The plurality of magnets 1220e-h located on each corner of the square pattern 1290 generate magnetic fields vertically in vertical directions in the z-direction (e.g., parallel to a direction from the lens and toward the image sensor). In one example, a north pole of each magnet of the plurality of magnets 1220e-h faces downwardly toward the image sensor and the south pole of each magnet of the plurality of magnets 1220e-h faces upwardly and toward the lens.

The first AF coil 1222e associated with a fifth magnet 1220e is located in the ninth location 1209. The second AF coil 1222f associated with a sixth magnet 1220f is located in the tenth location 1210. The third AF coil 1222g associated with a seventh magnet 1220g is located in the eleventh location 1211. The fourth AF coil 1222h associated with an eighth magnet 1220h is located in the twelfth location 1212.

The first OIS coil 1224a associated with a first magnet 1220a is located in a second location 1202. The second OIS coil 1224b associated with a second magnet 1202b is located in a fourth location 1204. The third OIS coil 1224c associated with a third magnet 1220c is located in a sixth location 1206. The fourth OIS coil 1224d associated with a fourth magnet 1220d is located in an eighth location 1208.

In one embodiment, which can be combined with other embodiments, the first plurality of magnets 1220e-h are associated with moving the lens, and the second plurality of magnets 1220a-d are associated with moving the image sensor. In one embodiment, which can be combined with other embodiments, the first plurality of magnets 1220e-h are associated with moving the image sensor, and the second plurality of magnets 1220a-d are associated with moving the lens.

In one embodiment, which can be combined with other embodiments, the AF coils 1222e-h are aligned entirely under respective magnets of the first plurality of magnets 1220e-h. In one embodiment, which can be combined with other embodiments, each AF coil of the AF coils 1222e-h is aligned between an inner surface and an outer surface of a respective magnet of the first plurality of magnets 1220e-h.

In one example, centers of the AF coils 1222e-h in the x-y plane are aligned vertically under centers of respective magnets of the first plurality of magnets 1220e-h in the x-y plane. In one example, a center of each AF coil of the AF coils 1222e-h in the x-y plane is aligned between an inner surface and an outer surface of each respective magnet of the first plurality of magnets 1220e-h in the x-y plane. Magnetizations of the first plurality of magnets 1220e-h being oriented vertically in vertical directions facilitates aligning each AF coil of the AF coils 1222e-h between an inner surface and an outer surface of a respective magnet of the first plurality of magnets 1220e-h.

By including separate magnets for each of the plurality of AF coils 1222e-h and for each of the plurality of OIS coils 1224a-d, the edges and corners of the square pattern are more fully utilized, facilitating compactness of optical devices and camera systems. Space within the square pattern 1290 is also saved as each of the plurality of AF coils 1222e-h are located either underneath, above, or both underneath and above the plurality of magnets 1220e-h associated with each of the plurality of AF coils 1222e-h. Furthermore, the magnetic field may be maximized for both the plurality of AF coils 1222e-h and the plurality of OIS coils 1224a-d, such that each coil 1222e-h is associated with an individual magnet of the plurality of magnets 1220a-h. By maximizing the magnetic field applied to each of the plurality of OIS coils 1224a-d and the plurality of AF coils 1222e-h, power may be saved.

Figure 13:
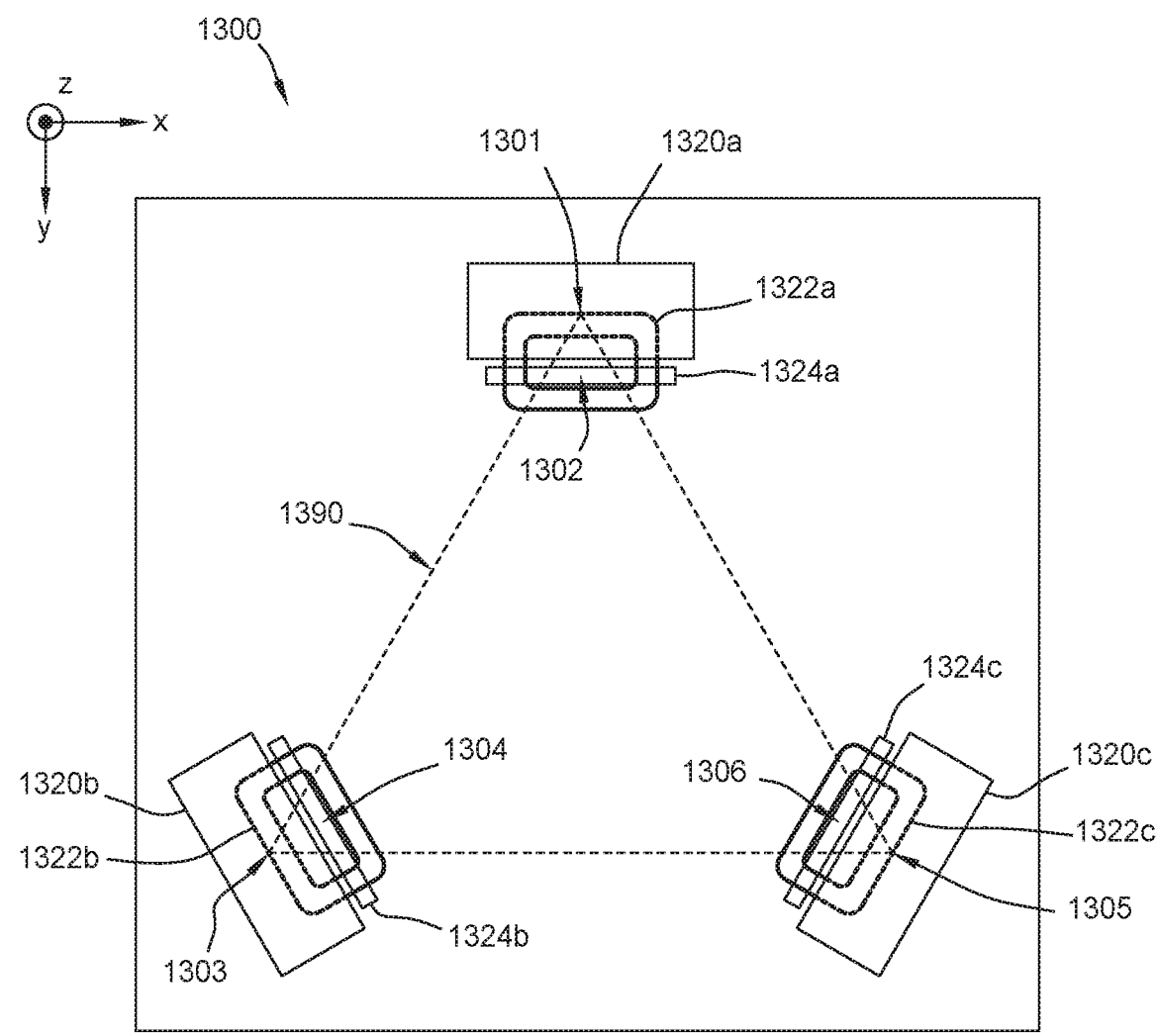

FIG. 13 illustrates a schematic top view of a multiple coil arrangement 1300 of an optical device, according to disclosed embodiments. The multiple coil arrangement 1300 includes three magnets 1320a-c, three AF coils 1322a-c, and three OIS coils 1324a-c disposed along a triangular pattern 1390. Each corner of the triangular pattern 1390 includes a magnet from the three magnets 1320a-c. A first magnet 1320a is located in a first location 1301, a second magnet 1320b is located in a third location 1303, and a third magnet 1320c is located in a fifth location 1305. The magnets 1320a-c, the AF coils 1322a-c, and the OIS coils 1324a-c are oriented toward a center of the triangular pattern 1390. In one embodiment, which can be combined with other embodiments, centers of the three magnets 1320a-c in the x-y plane are aligned with the three respective corners of the triangular pattern 1390.

The first AF coil 1322a associated with the first magnet 1320a is located between the first location 1301 and a second location 1302. The second AF coil 1322b associated with the second magnet 1320b is located between the third location 1303 and a fourth location 1304. The third AF coil 1322c associated with the third magnet 1320c is located between the fifth location 1305 and a sixth location 1306. The present disclosure contemplates that the OIS coils 1324a-c may be disposed on outward sides of each respective magnet, such as aligned with or disposed outwardly of outward surfaces of the magnets 1320a-c. The present disclosure contemplates that the AF coils 1322a-c may be disposed on outward sides of each respective magnet, such as aligned with or disposed outwardly of outward surfaces of the magnets 1320a-c. The first OIS coil 1324a associated with the first magnet 1320a is located in the second location 1302. The second OIS coil 1324b associated with the second magnet 1320b is located in the fourth location 1304. The third OIS coil 1324c associated with the third magnet 1320c is located in the sixth location 1306.

Figure 14A:
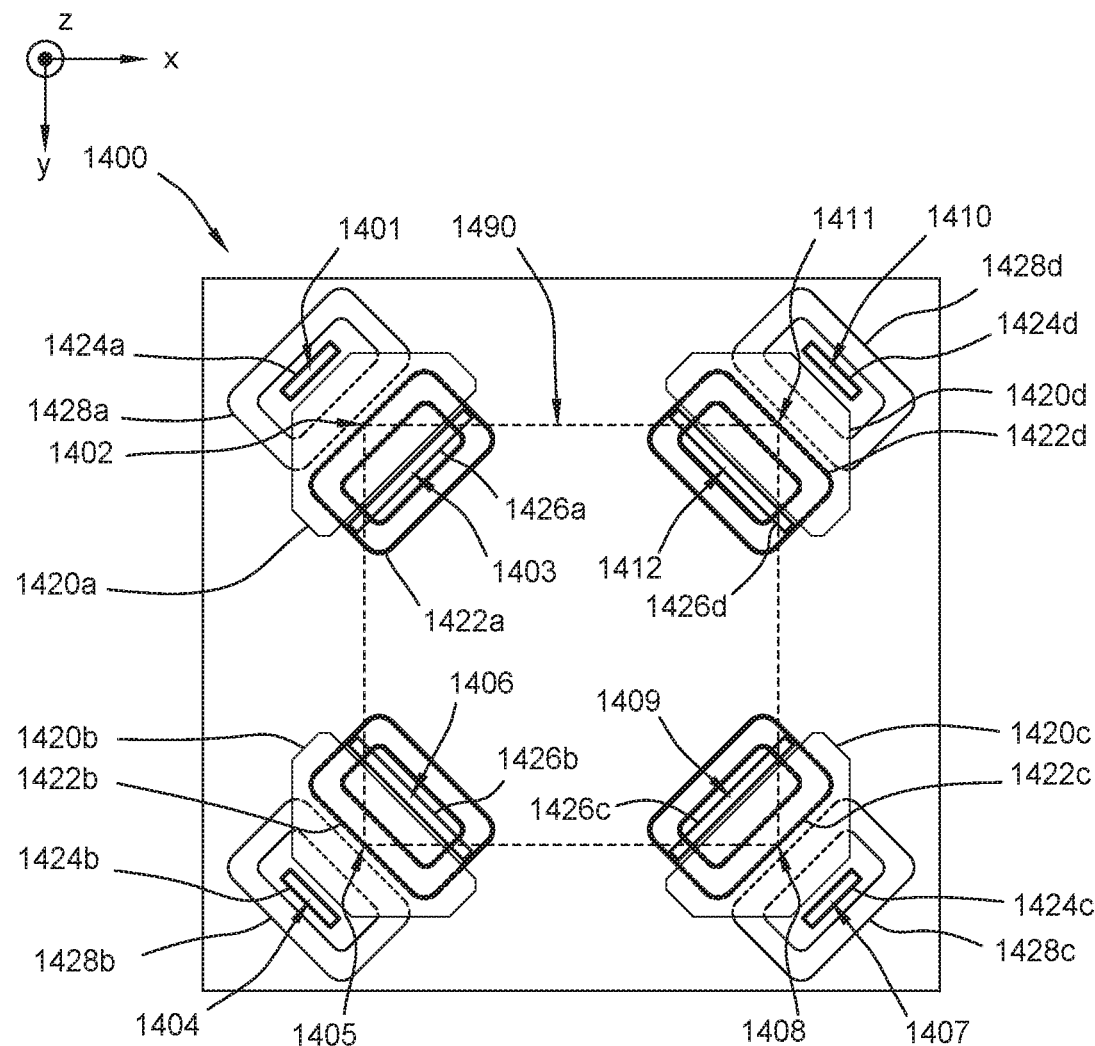
FIG. 14A illustrates a schematic top view of a multiple coil arrangement of an optical device, according to disclosed embodiments.

FIG. 14A illustrates a schematic top view of a multiple coil arrangement 1400 of an optical device, according to disclosed embodiments. The multiple coil arrangement 1400 includes four magnets 1420a-d (a plurality of magnets) disposed about a lens, four first AF coils 1422a-d (a first plurality of horizontal coil structures) coiled in one or more horizontal planes, and four first OIS coils 1426a-d (a second plurality of vertical coil structures) coiled in one or more vertical planes. The multiple coil arrangement 1400 includes four second OIS coils 1424a-d (a first plurality of vertical coil structures) coiled in one or more vertical planes, and four second AF coils 1428a-d (a second plurality of horizontal coil structures) coiled in one or more horizontal planes. The magnets 1420a-d, first AF coils 1422a-d, first OIS coils 1426a-d, second OIS coils 1424a-d, and second AF coils 1428a-d are disposed at corners of a square pattern 1490.

The present disclosure contemplates that, for exemplary purposes, the first AF coils 1422a-d may be referred to as first lens coils, the first OIS coils 1426a-d may be referred to as second lens coils, the second OIS coils 1424a-d may be referred to as first IS coils, and the second AF coils 1428a-d may be referred to as second IS coils.

The four first AF coils 1422a-d shift the lens in the z-direction when powered and may operate independently of each other (e.g., have different electrical currents). Furthermore, four first OIS coils 1426a-d shift the lens in the x-y plane when powered and may operate independently of each other (e.g., have different electrical currents). The second OIS coils 1424a-d shift the image sensor in the x-y plane when powered, and the second AF coils 1428a-d shift the image sensor in the z-direction when powered. The second OIS 1424a-d and the second AF coils 1428a-d may operate independently of each other (e.g., have different electrical currents). In one example, the lens may be tilted relative to the Z-axis using application of different electrical power to at least two of the first AF coils 1422a-d. In one example, the image sensor may be tilted relative to the Z-axis using application of different electrical power to at least two of the second AF coils 1428a-d. Other configurations not specifically shown in FIG. 14A are contemplated and may be applicable to the disclosed embodiments.

The vertical and horizontal coils (the first AF coils 1422a-d and first OIS coils 1426a-d) that move the lens horizontally and/or vertically are on the same side (e.g., on inward sides) of each respective magnet of the plurality of magnets 1420a-d. The vertical and horizontal coils (the second OIS coils 1424a-d and second AF coils 1428a-d) that move the image sensor horizontally and/or vertically are on the same side (e.g., on outward sides) of each respective magnet of the plurality of magnets 1420a-d. The positions of the various coils may be swapped such that the first AF coils 1422a-d and first OIS coils 1426a-d are disposed on outward sides of each respective magnet, and the second OIS coils 1424a-d and second AF coils 1428a-d are disposed on inward sides of each respective magnet.

The first magnet 1420a is located in a second location 1402, the second magnet 1420b is located in a fifth location 1405, the third magnet 1420c is located in an eighth location 1408, and the fourth magnet 1420d is located in an eleventh location 1411.

A first AF coil 1422a associated with the first magnet 1420a is located between the second location 1402 and a third location 1403. A first AF coil 1422b associated with the second magnet 1420b is located between the fifth location 1405 and a sixth location 1406. A first AF coil 1422c associated with the third magnet 1420c is located between the eighth location 1408 and a ninth location 1409. A first AF coil 1422d associated with the fourth magnet 1420d is located between the eleventh location 1411 and a twelfth location 1412.

A first OIS coil 1426a associated with the first magnet 1420a is located at the third location 1403. A first OIS coil 1426b associated with the second magnet 1420b is located at the sixth location 1406. A first OIS coil 1426c associated with the third magnet 1420c is located at the ninth location 1409. A first OIS coil 1426d associated with the fourth magnet 1420d is located at the twelfth location 1412.

The second OIS coil 1424a associated with the first magnet 1420a is located in a first location 1401. The second OIS coil 1424b associated with the second magnet 1420b is located in a fourth location 1404. The second OIS coil 1424c associated with the third magnet 1420c is located in a seventh location 1407. The second OIS coil 1424d associated with the fourth magnet 1420d is located in a tenth location 1410.

A second AF coil 1428a associated with the first magnet 1420a is located between the first location 1401 and the second location 1402. A second AF coil 1428b associated with the second magnet 1420b is located between the fourth location 1404 and the fifth location 1405. A second AF coil 1428c associated with the third magnet 1420c is located between the seventh location 1407 and the eighth location 1408. A second AF coil 1428d associated with the fourth magnet 1420d is located between the tenth location 1410 and the eleventh location 1411.

Figure 14B:
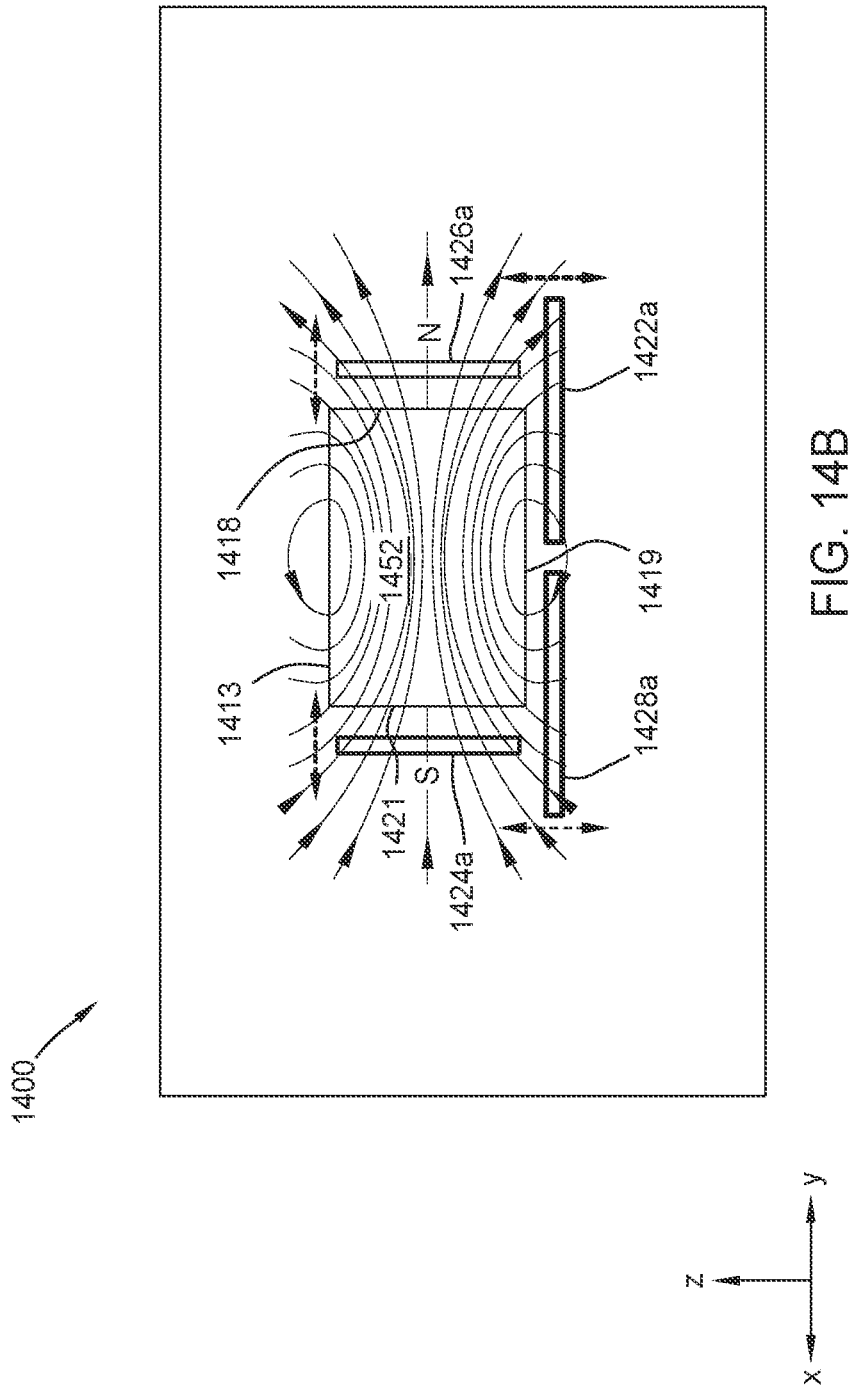
FIG. 14B illustrates a schematic partial side view of the multiple coil arrangement 1400 shown in FIG. 14A, according to disclosed embodiments.

FIG. 14B illustrates a schematic partial side view of the multiple coil arrangement 1400 shown in FIG. 14A, according to disclosed embodiments. The multiple coil arrangement 1400 of the optical device is a part of a camera system, such as the camera 104 of the device 100, the camera system 200, and/or the camera system 300. In the multiple coil arrangement 1400, the magnetic field of the magnet 1452 is illustrated by the solid arrows traveling from the south pole S to the north pole N of the magnet 1452. Though the multiple coil arrangement 1400 illustrates a single magnet 1452, the disclosed embodiments may reflect on all the magnets of the camera system, such as the magnets illustrated in FIGS. 3-14A. The first AF coil 1422a may adjust the lens along and relative to the z-direction, and the first OIS coil 1426a may adjust the lens relative to the x-y plane. The second OIS coil 1424a may adjust the image sensor along the x-y plane and the second AF coil 1428a may adjust the image sensor along and relative to the z-direction. It is contemplated that other configurations of the coils 1422a, 1424a, 1426a, 1428a may be applicable to the disclosed embodiments.

In FIG. 14B, the split coil design 1400 includes a first AF coil 1422a, a first OIS coil 1426a, a second OIS coil 1424a, and a second AF coil 1428a. The second OIS coil 1424a is disposed outwardly of an outer surface 1421 of the magnet 1452 and is coiled in a vertical plane adjacent to the magnet 1452. The second AF coil 1428a is disposed and aligned at least partially below a lower surface 1419 of the magnet 1452. The second AF coil 1428a includes a first portion aligned vertically under the magnet 1452 and a second portion aligned vertically outwardly of the outer surface 1421 of the magnet 1452. A center of the second AF coil 1428a is aligned vertically under or outwardly of the outer surface 1421 of the magnet 1452.

The first AF coil 1422a is aligned partially vertically under the lower surface 1419 of the magnet 1452. The first AF coil 1422a includes a first portion aligned vertically under the magnet 1452 and a second portion aligned vertically inwardly of an inner surface 1418 of the magnet 1452. A center of the first AF coil 1422a is aligned vertically under or inwardly of the inner surface 1418 of the magnet 1452.

In one example, the positions of the first AF coils 1422a (e.g., inward positions) are switched with the second AF coils 1428a (e.g., outward positions) and the positions of the first OIS coils 1426a (e.g., inward positions) are switched with the second OIS coils 1424a (e.g., outward positions). In one example, the first AF coil 1422a and/or the second AF coil 1428a may be located above the magnet 1452. In one example, the first AF coil 1422a and/or the second AF coil 1428a may be located both above and below the magnet 1452. In one example, one of the first AF coil 1422a or the second AF coil 1428a is located above the magnet 1452, and the other of the first AF coil 1422a or the second AF coil 1428a is located below the magnet 1452.

Figure 15:
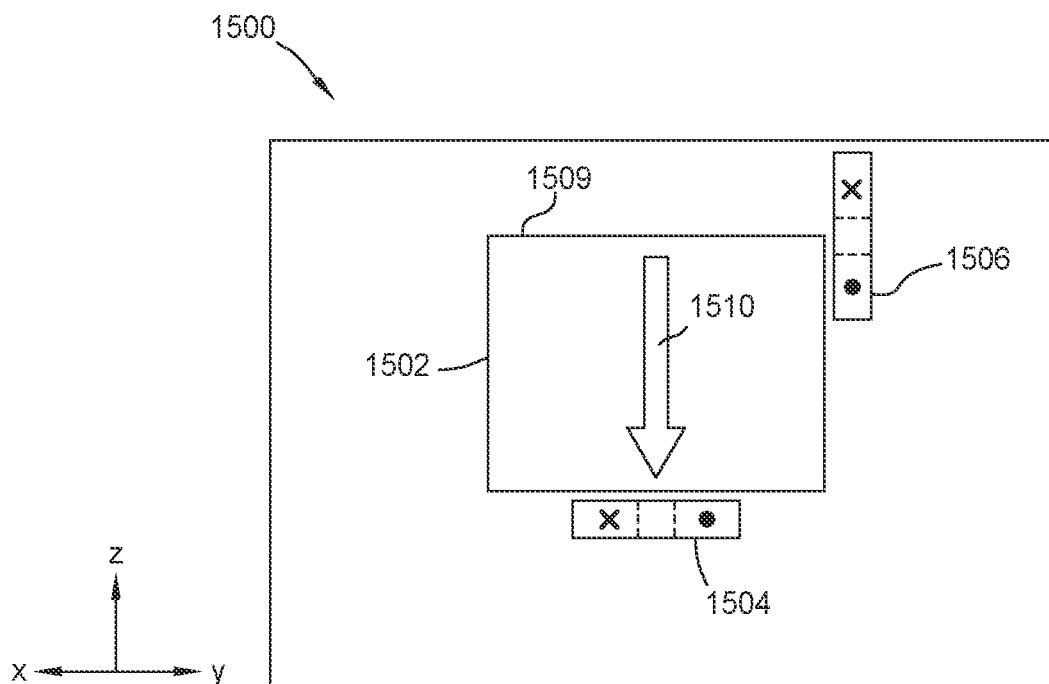
Figure 16:
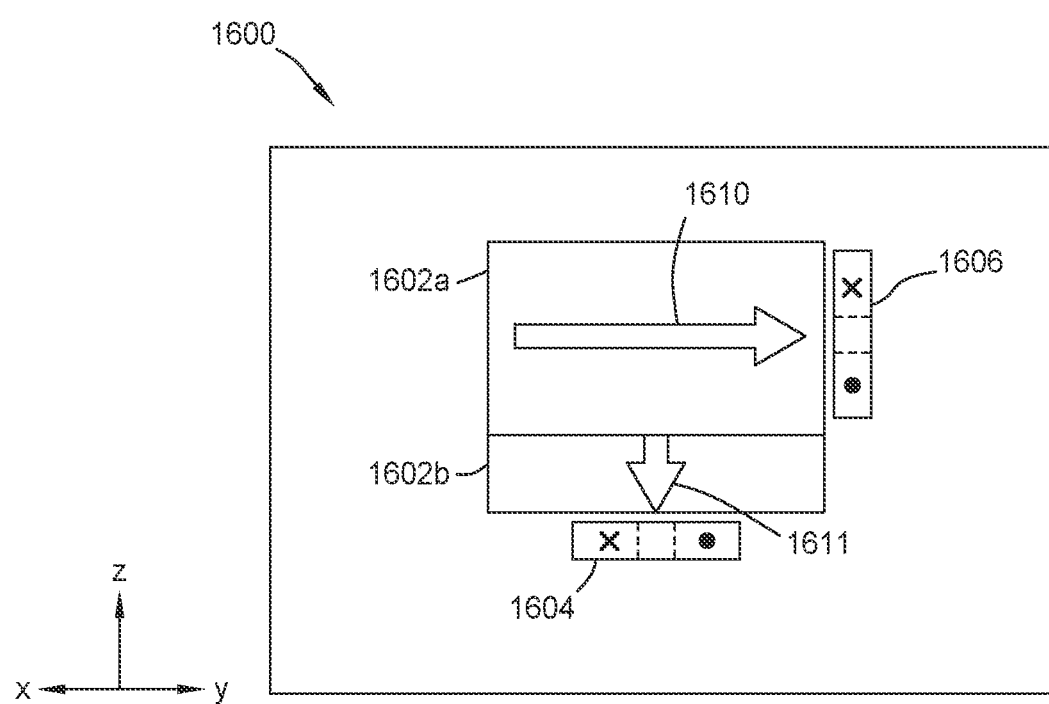

FIGS. 15-17 are schematic illustrations of side views of multiple coil arrangements 1500, 1600, 1700 of an optical device of a camera system, according to disclosed embodiments. Each magnet apparatus of the multiple coil arrangements 1500, 1600, 1700 may include two or more magnets coupled together. In one example of a multiple coil arrangement of a camera system including a single magnet for each magnet apparatus, a magnetic field generated points inwardly towards a center of a lens, such that the north pole of the magnet is faces inward towards the lens and the south pole of the magnet faces outwards away from the lens. In one example, the north pole of the magnet faces inward towards the lens and the south pole of the magnet faces outwards away from the lens at 180° opposite of the north pole (as shown in FIG. 16). In one example, the magnet is magnetized inward towards the lens at an angle, relative to the horizontal plane, and the angle is an oblique angle that is about 45° from the horizontal plane. In such an example where the magnet is magnetized at an oblique angle, the magnet is magnetized horizontally inwardly toward the lens and toward the OIS coil. The magnet is also magnetized vertically (e.g., downwardly) toward the image sensor and toward the AF coil. In one example, the magnet is magnetized at an angle relative to the horizontal plane, and the angle is about 90° (as shown in FIG. 15) from the horizontal plane. The listed angles are not intended to be limiting, but to provide an examples of possible embodiments. In yet another embodiment, the magnet may generate a magnetic field pointing in the z-direction.

In a multiple coil arrangement including a first magnet coupled to a second magnet, the first magnet may have a magnetic field generated that is antiparallel to the magnetic field generated by the second magnet. In one example, the first magnet may have a magnetic field generated that is perpendicular to the magnetic field generated by the second magnet.

The multiple coil arrangement 1500 shown in FIG. 15 illustrates a first magnet 1502 with a magnetic field 1510 pointing vertically downward in the negative z-direction. The magnetic field 1510 points perpendicularly, such as at a 90° angle relative to a horizontal plane (e.g., the x-y plane). An AF coil 1504 is coiled in a horizontal plane and is disposed below the first magnet 1502. The AF coil 1504 may be coupled to an image sensor or a lens to move the image sensor or the lens vertically. An OIS coil 1506 is coiled in a vertical plane and is disposed inwardly of the first magnet 1502. The OIS coil 1506 may be coupled to an image sensor or a lens to move the image sensor or the lens horizontally (e.g., in the x-y plane). The magnetic field 1510 oriented parallel to the z-axis facilitates the image sensor or the lens being moved along the z-axis if the image sensor or lens is attached to the AF coil 1504, and/or being moved along the x-y plane if the image sensor or lens is attached to the OIS coil 1506. A center of the OIS coil 1506 is aligned horizontally with an upper surface 1509 of the first magnet 1502.

The multiple coil arrangement 1600 shown in FIG. 16 illustrates a first magnet 1602*a* with a magnetic field 1610 pointing in a horizontal direction (e.g., inwardly and toward the lens) and a second magnet 1602*b* with a magnetic field 1611 pointing in a vertical direction (e.g., downwardly and toward the image sensor). A north pole of the first magnet 1602*a* faces inwardly toward the lens and a south pole of the first magnet 1602*a* faces outwardly away from the lens. A north pole of the second magnet 1602*b* faces downwardly (e.g., parallel to a direction from the lens and toward the image sensor) and a south pole of the second magnet 1602*b* faces upwardly (e.g., parallel to a direction from the image sensor and toward the lens). The magnetic field 1610 of the first magnet 1602*a* is perpendicular to the magnetic field 1611 of the second magnet 1602*b*. An AF coil 1604 is located parallel to the horizontal plane of the second magnet 1602*b*. An OIS coil 1606 is located parallel to the vertical plane of the first magnet 1602*a*. By having a dedicated second magnet 1602*b* acting on the AF coil 1604, the magnetic field experienced by the AF coil 1604 is larger, facilitating efficiency and less electrical power (e.g., current) needed for the AF coils. Thus, the amount of current needed to adjust the AF coil 1604 is reduced.

The multiple coil arrangement 1700 shown in FIG. 17 illustrates a first magnet 1702*a* with a magnetic field 1710 pointing in a horizontal direction and a second magnet 1702*b* with a magnetic field 1711 pointing to the opposite horizontal direction. A magnetization of the first magnet 1702*a* is antiparallel to a magnetization of the second magnet 1702*b*. The magnetic field 1710 of the first magnet 1702*a* is antiparallel to the magnetic field 1711 of the second magnet 1702*b*. An AF coil 1706 is located parallel to the vertical plane of both the first magnet 1702*a* and the second magnet 1702*b*. The antiparallel magnetic fields 1710, 1711 of the first magnet 1702*a* and the second magnet 1702*b* changes the AF coil 1706 force direction by 90°. By changing the AF coil 1706 force direction by 90°, the AF coil 1706 is able to move in the z-direction such that the AF coil 1706 is used to move a lens or an image sensor vertically in the z-direction. The AF coil 1706 is disposed inward of the first and second magnets 1702*a*, 1702*b* (as shown in FIG. 17) or outward of the first and second magnets 1702*a*, 1702*b*. An OIS coil 1704 is located below the second magnet 1702*b* and parallel to a horizontal plane of the second magnet 1702*b*. The OIS coil 1704 is used to move a lens or an image sensor in a horizontal direction, such as along the x-y plane. The antiparallel magnetic fields 1710, 1711 of the first magnet 1702*a* and the second magnet 1702*b* changes the OIS coil 1704 force direction by 90°. By changing the OIS coil 1704 force direction by 90°, the OIS coil 1704 is able to move in a horizontal direction. By having a dedicated second magnet 1702*b* acting on the OIS coil 1704, the magnetic field experienced by the OIS coil 1704 is larger, such as that where the AF coils and the OIS coils share the same magnetic field. Thus, the amount of current needed to adjust the OIS coil 1704 is reduced. In one embodiment, which can be combined with other embodiments, the second magnet 1702*b* is disposed in contact with the first magnet 1702*a*. In one example, the second magnet 1702*b* is coupled to the first magnet 1702*a*.

Though the multiple coil arrangements 1500, 1600, 1700 illustrate a single magnet 1502, a single pair of magnets 1602*a*, 1602*b*, and a single pair of magnets 1702*a*, 1702*b*, the disclosed embodiments may reflect on some or all of the plurality of magnets or the plurality of pairs of magnets of a camera system.

Benefits of the present disclosure include utilizing coil structures (such as vertical coil structures) to facilitate independently moving image sensors relative to lenses, and that facilitate tilt, optimal image stabilization (OIS), and auotofocus (AF) functions of camera systems. By using magnetic field directions described herein for magnets or by having dedicated magnets for each of the plurality of lens coils and/or the plurality of IS coils, power and space within the optical device and camera system may be saved. Furthermore, by adjusting the currents of the IS coils individually, an image sensor tilt and/or shift is achieved. The image sensor tilt and/or shift as well as the lens tilt may allow for an optimal optical path of the lens to the image sensor for the autofocus function and an optimal image on the image sensor in response to motion detected by the gyroscope.

It is contemplated that one or more aspects disclosed herein may be combined. Moreover, it is contemplated that one or more aspects disclosed herein may include some or all of the aforementioned benefits. As an example, the present disclosure contemplates that one or more of the aspects, features, components, and/or properties of the lens 304, the image sensor 310, the multiple coil arrangements 400, 425, 450, the multiple coil arrangements 500-1400, and/or the multiple coil arrangements 1500-1700 may be combined.

In one embodiment, an optical device comprises a lens and an image sensor disposed below the lens. The image sensor is movable relative to the lens. The optical device includes a plurality of magnets disposed about the lens and magnetized horizontally toward the lens to generate magnetic fields horizontally in horizontal directions toward the lens. The optical device includes a plurality of vertical coil structures coiled in one or more vertical planes, and one or more horizontal coil structures coiled in one or more horizontal planes. The optical device also includes a second plurality of magnets disposed above or below the plurality of magnets, where the second plurality of magnets are magnetized vertically to generate magnetic fields vertically in vertical directions toward the one or more horizontal coil structures. In one example, a north pole of each magnet of the plurality of magnets faces inwardly toward the lens, and a south pole of each magnet of the plurality of magnets faces outwardly away from the lens. In one example, a north pole of each magnet of the second plurality of magnets faces downwardly and parallel to a direction from the lens and toward the image sensor, and a south pole of each magnet of the second plurality of magnets faces upwardly and parallel to a direction from the image sensor and toward the lens. Each magnet of the second plurality of magnets is coupled to a respective magnet of the plurality of magnets. The plurality of magnets are disposed at corners of a pattern or at sides of the pattern. The pattern is a square pattern or a triangular pattern.

A surface of each magnet of the plurality of magnets faces a respective horizontal coil structure of the one or more horizontal coil structures. The surface of each magnet includes a first surface area, and the respective horizontal coil structure includes a second surface area facing the surface of the magnet. The second surface area is a ratio of the first surface area, and the ratio is within a range of 0.8 to 1.2. In one example, each vertical coil structure of the plurality of vertical coil structures is disposed inwardly of an inner surface of a respective magnet of the plurality of magnets, or disposed outwardly of an outer surface of the respective magnet of the plurality of magnets. In one example, each horizontal coil structure of the one or more horizontal coil structures is disposed at least partially above an upper surface of a respective magnet of the plurality of magnets, or at least partially below a lower surface of the respective magnet of the plurality of magnets. A camera system that includes the optical device is also disclosed.

In one embodiment, an optical device comprises a lens, and an image sensor disposed below the lens. The image sensor is movable relative to the lens. The optical device includes a first plurality of magnets disposed about the lens and at corners of a square pattern, and a second plurality of magnets disposed about the lens and at sides of the square pattern. The optical device includes a plurality of vertical coil structures coiled in one or more vertical planes that, when powered, horizontally move the image sensor or the lens. Each vertical coil structure of the plurality of vertical coil structures is disposed inwardly of an inner surface of a respective magnet of the second plurality of magnets. The optical device includes a plurality of horizontal coil structures coiled in one or more horizontal planes that, when powered, move the lens or the image sensor. Each horizontal coil structure of the plurality of horizontal coil structures includes a center aligned above or below a respective magnet of the first plurality of magnets. The first plurality of magnets are magnetized vertically to generate magnetic fields vertically in vertical directions, and the second plurality of magnets are magnetized horizontally toward the lens to generate magnetic fields horizontally in horizontal directions toward the lens. Each horizontal coil structure of the plurality of horizontal coil structures is aligned between an inner surface and an outer surface of a respective magnet of the first plurality of magnets. A camera system including the optical device is also disclosed.

In one embodiment, an optical device comprises a lens and an image sensor disposed below the lens. The image sensor is movable relative to the lens. The optical device includes a first plurality of magnets disposed about the lens and magnetized horizontally toward the lens to generate magnetic fields horizontally in horizontal directions toward the lens, and a second plurality of magnets disposed about the lens and magnetized horizontally away from the lens to generate magnetic fields horizontally in horizontal directions away from the lens. Each magnet of the second plurality of magnets is disposed above or below a respective magnet of the first plurality of magnets. The optical device also includes one or more horizontal coil structures coiled in one or more horizontal planes that, when powered, horizontally move the lens or the image sensor. The optical device also includes a plurality of vertical coil structures coiled in one or more vertical planes that, when powered, move the image sensor relative to the lens. In one example, each vertical coil structure of the plurality of vertical coil structures is disposed inwardly of an inner surface of a respective magnet of the first plurality of magnets and inwardly of an inner surface of a respective magnet of the second plurality of magnets. In one example, each vertical coil structure of the plurality of vertical coil structures is disposed outwardly of an outer surface of a respective magnet of the first plurality of magnets and outwardly of an outer surface of a respective magnet of the second plurality of magnets. Each magnet of the second plurality of magnets is coupled to a respective magnet of the first plurality of magnets. A magnetization of each magnet of the first plurality of magnets is antiparallel to a magnetization of a respective magnet of the second plurality of magnets. A camera system including the optical device is also disclosed.

While the foregoing is directed to embodiments of the present disclosure, other and further embodiments of the disclosure may be devised without departing from the basic scope thereof, and the scope thereof is determined by the claims that follow.

What is claimed is:

1. An optical device, comprising:
   a lens;
   an image sensor disposed below the lens, wherein the image sensor is movable relative to the lens;
   a first plurality of magnets disposed about the lens and magnetized horizontally toward the lens to generate magnetic fields horizontally in horizontal directions toward the lens;
   a plurality of vertical coil structures coiled in one or more vertical planes;
   one or more horizontal coil structures coiled in one or more horizontal planes; and
   a second plurality of magnets disposed above or below the first plurality of magnets, wherein the second plurality of magnets are magnetized vertically to generate magnetic fields vertically in vertical directions toward the one or more horizontal coil structures.

2. The optical device of claim 1, wherein a north pole of each magnet of the first plurality of magnets faces inwardly toward the lens, and a south pole of each magnet of the first plurality of magnets faces outwardly away from the lens.

3. The optical device of claim 2, wherein a north pole of each magnet of the second plurality of magnets faces downwardly and parallel to a direction from the lens and toward the image sensor, and a south pole of each magnet of the second plurality of magnets faces upwardly and parallel to a direction from the image sensor and toward the lens.

4. The optical device of claim 1, wherein each magnet of the second plurality of magnets is coupled to a respective magnet of the first plurality of magnets.

5. The optical device of claim 1, wherein the first plurality of magnets are disposed at corners of a pattern or at sides of the pattern, wherein the pattern is a square pattern or a triangular pattern.

6. The optical device of claim 1, wherein a surface of each magnet of the first plurality of magnets faces a respective horizontal coil structure of the one or more horizontal coil structures, the surface of each magnet includes a first surface area, and the respective horizontal coil structure includes a second surface area facing the surface of the magnet, wherein the second surface area is a ratio of the first surface area, and the ratio is within a range of 0.8 to 1.2.

7. The optical device of claim 1, wherein each vertical coil structure of the plurality of vertical coil structures is disposed inwardly of an inner surface of a respective magnet of the first plurality of magnets, or disposed outwardly of an outer surface of the respective magnet of the first plurality of magnets.

8. The optical device of claim 1, wherein each horizontal coil structure of the one or more horizontal coil structures is disposed at least partially above an upper surface of a respective magnet of the first plurality of magnets, or at least partially below a lower surface of the respective magnet of the first plurality of magnets.

9. A camera system comprising the optical device of claim 1.

10. The optical device of claim 1, further comprising a base defining an X-Y plane extending parallel to the base and a Z-axis extending perpendicularly to the X-Y plane, wherein the image sensor is disposed below the lens along the Z-axis, the one or more vertical planes extend parallel to the Z-axis, and the one or more horizontal planes are oriented perpendicularly to the one or more vertical planes and the Z-axis.

11. An optical device, comprising:
a lens;
an image sensor disposed below the lens, wherein the image sensor is movable relative to the lens;
a first plurality of magnets disposed about the lens and at corners of a square pattern;
a second plurality of magnets disposed about the lens and at sides of the square pattern;
a plurality of vertical coil structures coiled in one or more vertical planes that, when powered, horizontally move the image sensor or the lens, each vertical coil structure of the plurality of vertical coil structures disposed inwardly of an inner surface of a respective magnet of the second plurality of magnets;
a plurality of horizontal coil structures coiled in one or more horizontal planes that, when powered, move the lens or the image sensor, and each horizontal coil structure of the plurality of horizontal coil structures includes a center aligned above or below a respective magnet of the first plurality of magnets.

12. The optical device of claim 11, wherein the first plurality of magnets are magnetized vertically to generate magnetic fields vertically in vertical directions, and the second plurality of magnets are magnetized horizontally toward the lens to generate magnetic fields horizontally in horizontal directions toward the lens.

13. The optical device of claim 11, wherein each horizontal coil structure of the plurality of horizontal coil structures is aligned between an inner surface and an outer surface of a respective magnet of the first plurality of magnets.

14. A camera system comprising the optical device of claim 11.

15. The optical device of claim 11, further comprising a base defining an X-Y plane extending parallel to the base and a Z-axis extending perpendicularly to the X-Y plane, wherein the image sensor is disposed below the lens along the Z-axis, the one or more vertical planes extend parallel to the Z-axis, and the one or more horizontal planes are oriented perpendicularly to the one or more vertical planes and the Z-axis.

16. An optical device, comprising:
a lens;
an image sensor disposed below the lens, wherein the image sensor is movable relative to the lens;
a first plurality of magnets disposed about the lens and magnetized horizontally toward the lens to generate magnetic fields horizontally in horizontal directions toward the lens;
a second plurality of magnets disposed about the lens and magnetized horizontally away from the lens to generate magnetic fields horizontally in horizontal directions away from the lens, wherein each magnet of the second plurality of magnets is disposed above or below a respective magnet of the first plurality of magnets; and
one or more horizontal coil structures coiled in one or more horizontal planes that, when powered, horizontally move the lens or the image sensor.

17. The optical device of claim 16, further comprising a plurality of vertical coil structures coiled in one or more vertical planes that, when powered, vertically move the lens or the image sensor, wherein each vertical coil structure of the plurality of vertical coil structures is disposed inwardly of an inner surface of a respective magnet of the first plurality of magnets and inwardly of an inner surface of a respective magnet of the second plurality of magnets.

18. The optical device of claim 16, further comprising a plurality of vertical coil structures coiled in one or more vertical planes that, when powered, vertically move the lens or the image sensor, wherein each vertical coil structure of the plurality of vertical coil structures is disposed outwardly of an outer surface of a respective magnet of the first plurality of magnets and outwardly of an outer surface of a respective magnet of the second plurality of magnets.

19. The optical device of claim 16, wherein each magnet of the second plurality of magnets is coupled to a respective magnet of the first plurality of magnets.

20. The optical device of claim 16, wherein a magnetization of each magnet of the first plurality of magnets is antiparallel to a magnetization of a respective magnet of the second plurality of magnets.

21. A camera system comprising the optical device of claim 16.

22. The optical device of claim 16, further comprising a base defining an X-Y plane extending parallel to the base and a Z-axis extending perpendicularly to the X-Y plane, wherein the image sensor is disposed below the lens along the Z-axis, and the one or more horizontal planes are oriented perpendicularly to the Z-axis.

23. An optical device, comprising:
a lens;
an image sensor disposed below the lens, wherein the image sensor is movable relative to the lens;
a plurality of magnets disposed about the lens and magnetized horizontally toward the lens to generate magnetic fields horizontally in horizontal directions toward the lens;
a plurality of vertical coil structures coiled in one or more vertical planes; and
one or more horizontal coil structures coiled in one or more horizontal planes, wherein a surface of each magnet of the plurality of magnets faces a respective horizontal coil structure of the one or more horizontal coil structures, the surface of each magnet includes a first surface area, and the respective horizontal coil structure includes a second surface area facing the surface of the magnet, wherein the second surface area is a ratio of the first surface area, and the ratio is within a range of 0.8 to 1.2.

24. The optical device of claim 23, further comprising a base defining an X-Y plane extending parallel to the base and a Z-axis extending perpendicularly to the X-Y plane, wherein the image sensor is disposed below the lens along the Z-axis, the one or more vertical planes extend parallel to the Z-axis, and the one or more horizontal planes are oriented perpendicularly to the one or more vertical planes and the Z-axis.

* * * * *